United States Patent
Hoshizawa et al.

(10) Patent No.: US 9,013,972 B2
(45) Date of Patent: Apr. 21, 2015

(54) OPTICAL INFORMATION RECORDING AND REPRODUCING METHOD AND DEVICE

(71) Applicant: Hitachi Consumer Electronics Co., Ltd., Tokyo (JP)

(72) Inventors: Taku Hoshizawa, Hayama (JP); Yusuke Nakamura, Ebina (JP)

(73) Assignee: Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 13/901,601

(22) Filed: May 24, 2013

(65) Prior Publication Data

US 2014/0003221 A1    Jan. 2, 2014

(30) Foreign Application Priority Data

Jun. 29, 2012  (JP) .................................. 2012-146305

(51) Int. Cl.
G11B 7/0065    (2006.01)
G11B 7/007     (2006.01)

(52) U.S. Cl.
CPC .................................. *G11B 7/00772* (2013.01)

(58) Field of Classification Search
None
See application file for complete search history.

(56) References Cited

U.S. PATENT DOCUMENTS

| | | | | |
|---|---|---|---|---|
| 5,237,553 | A * | 8/1993 | Fukushima et al. | 369/53.17 |
| 5,504,504 | A * | 4/1996 | Markandey et al. | 345/214 |
| 7,564,761 | B2 * | 7/2009 | Taguchi | 369/103 |
| 7,826,325 | B2 * | 11/2010 | Tokuyama | 369/103 |
| 2005/0162989 | A1 * | 7/2005 | Hwang et al. | 369/30.03 |
| 2006/0192866 | A1 | 8/2006 | Taguchi | |
| 2006/0215527 | A1 * | 9/2006 | Uchida et al. | 369/103 |
| 2007/0171796 | A1 * | 7/2007 | Tokuyama | 369/53.15 |
| 2014/0003221 | A1 * | 1/2014 | Hoshizawa et al. | 369/103 |

FOREIGN PATENT DOCUMENTS

JP    2006-236536    9/2006

* cited by examiner

*Primary Examiner* — Peter Vincent Agustin
(74) *Attorney, Agent, or Firm* — Baker Botts L.L.P.

(57) ABSTRACT

Disclosed is an optical information recording and reproducing device capable of recording an interference fringe pattern as a hologram in an optical information recording medium, the interference fringe pattern being formed by a signal beam superimposed with signal information and a reference beam, and also capable of reproducing the signal information from the optical information recording medium, the device having a light source unit to emit light, a light splitting unit to split the light into the reference beam and the signal beam, a spatial light modulation unit to superimpose the signal information on the signal light, and a light detection unit to detect an image reproduced by the reference beam, wherein information about defects on the spatial light modulation unit is recorded in the optical information recording medium.

4 Claims, 22 Drawing Sheets

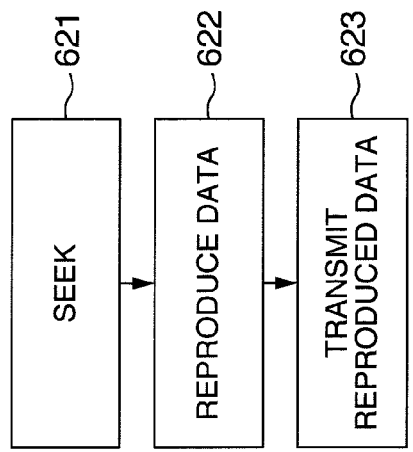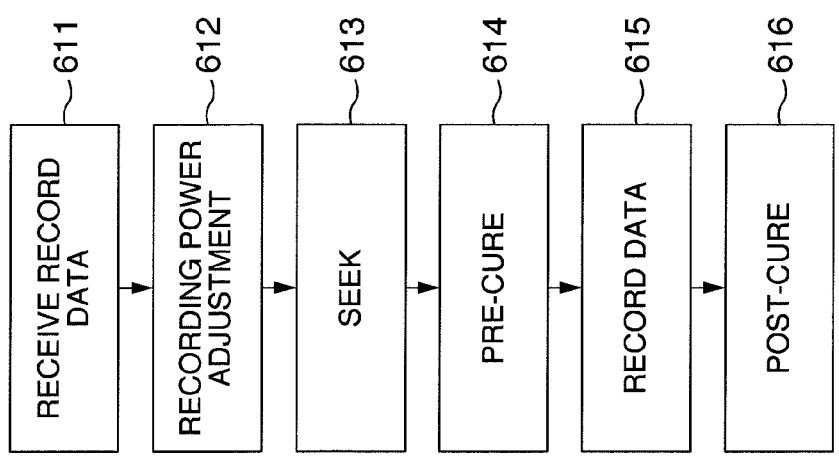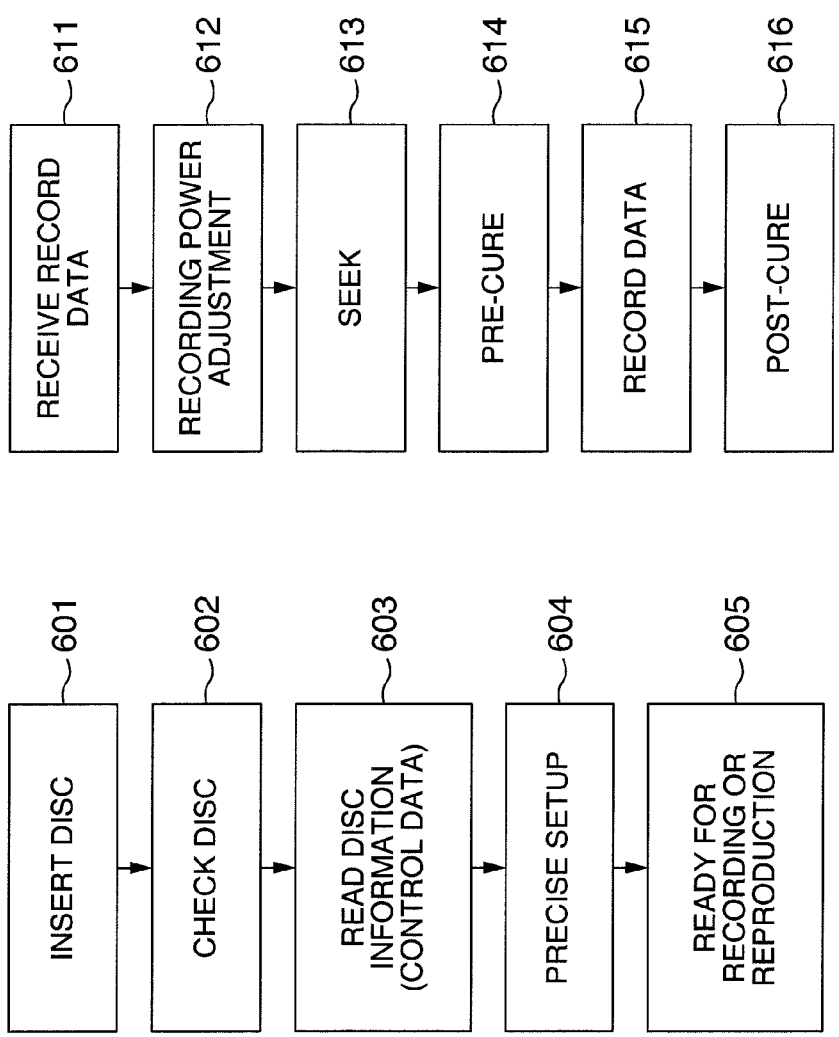

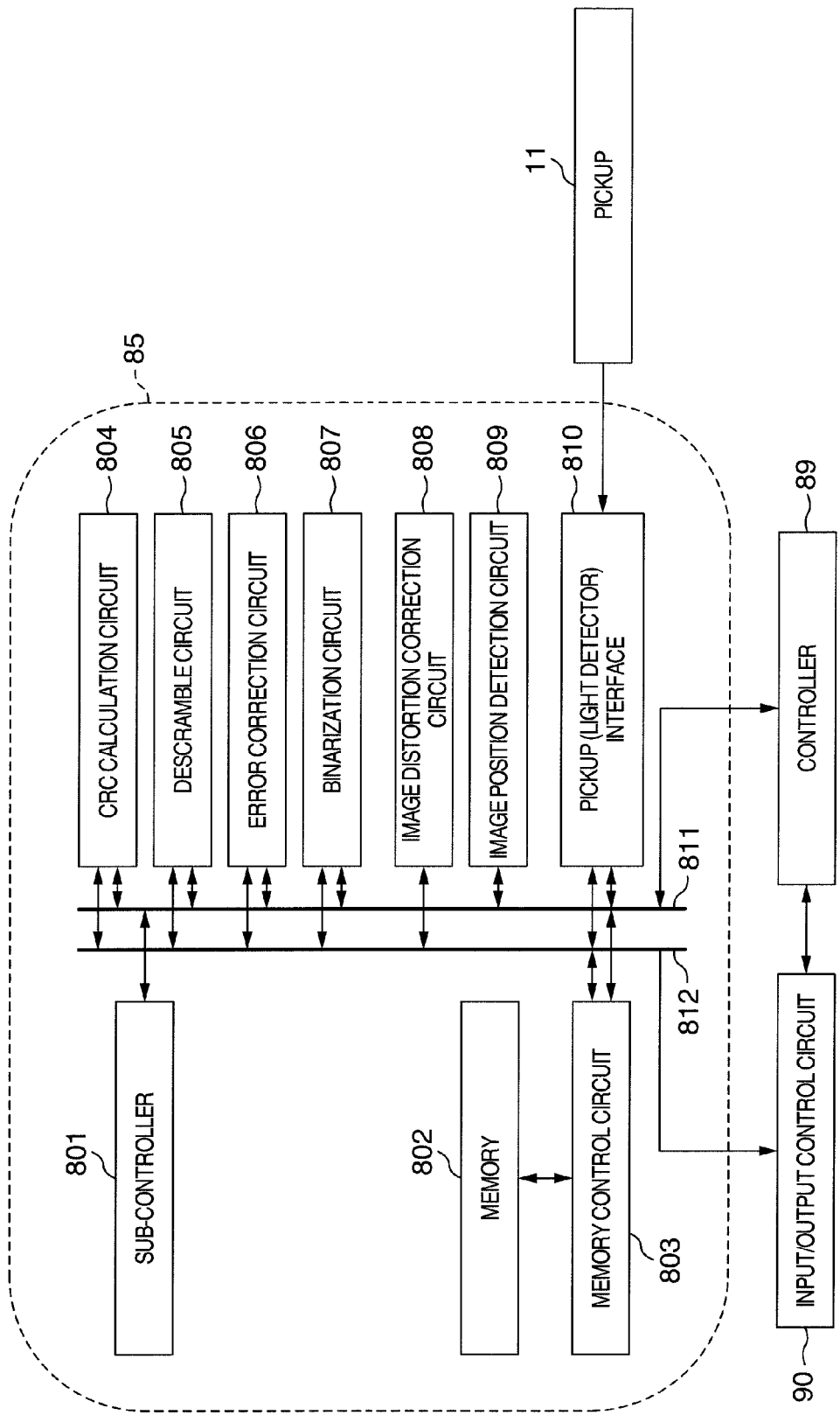

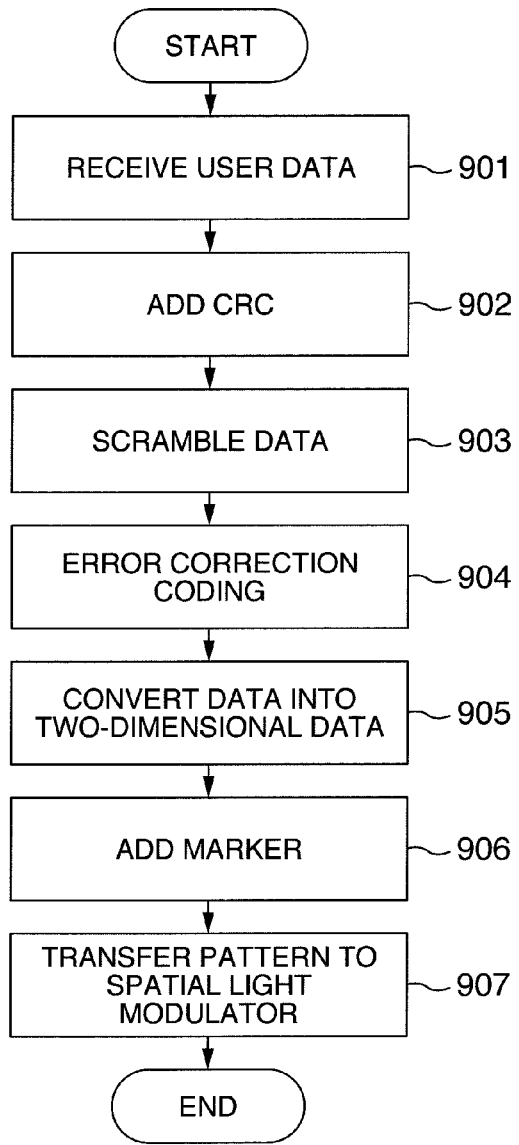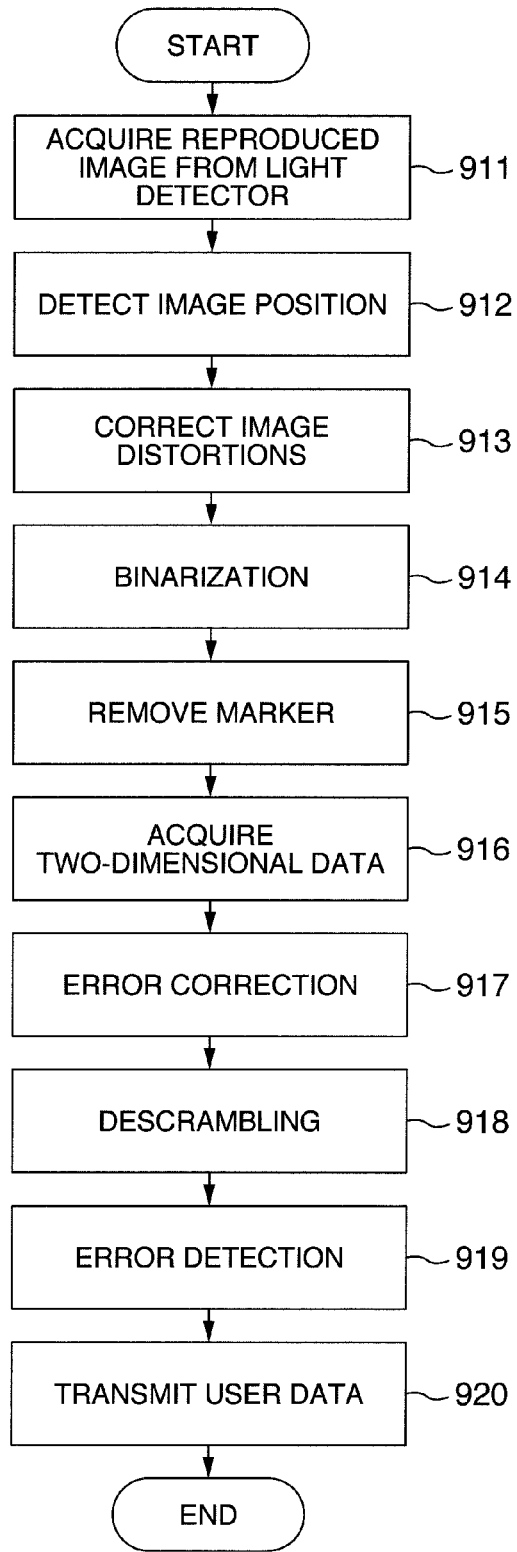

FIG.14
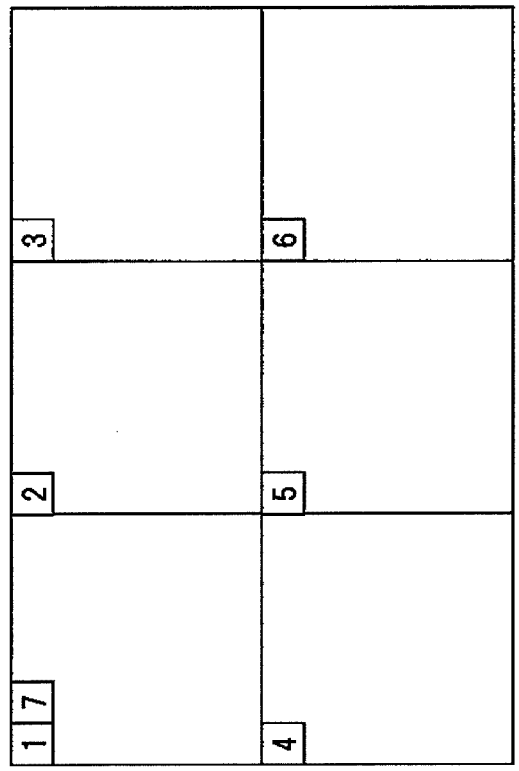
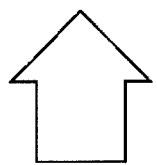

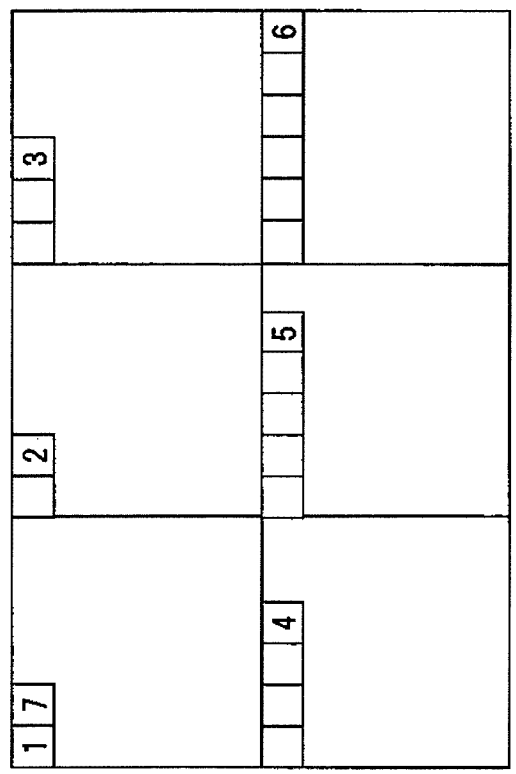
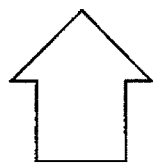
FIG.15

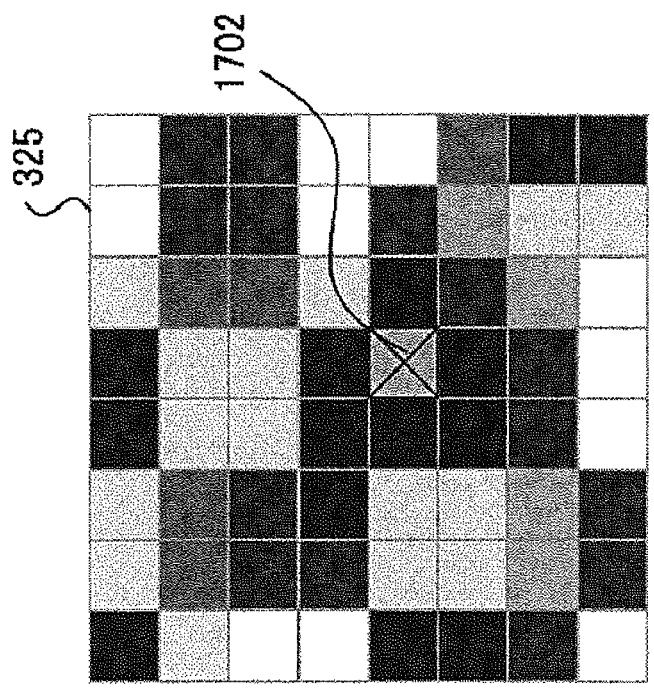
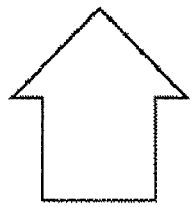
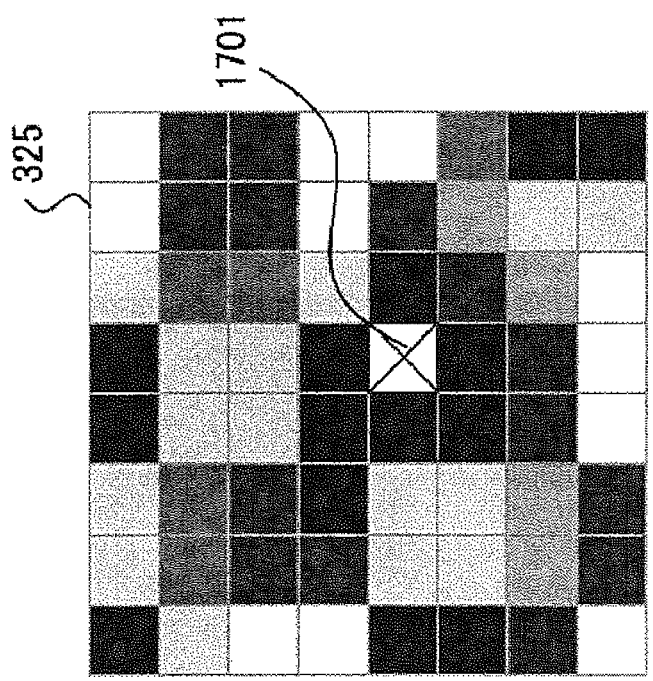
FIG.17

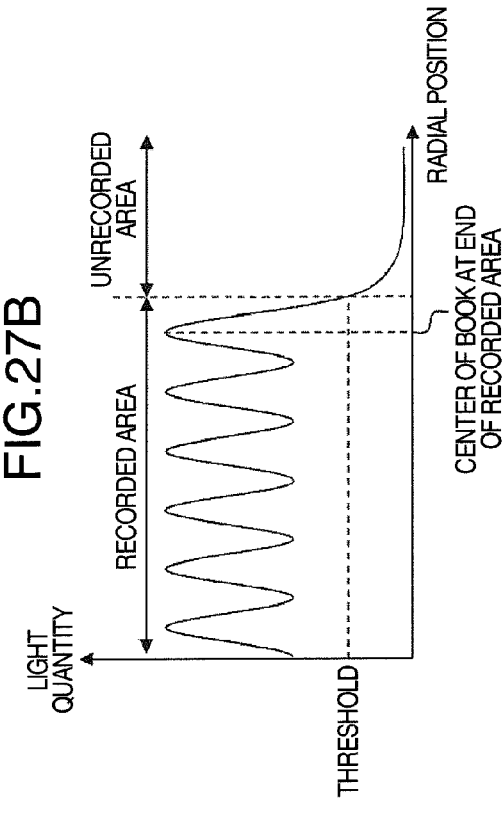
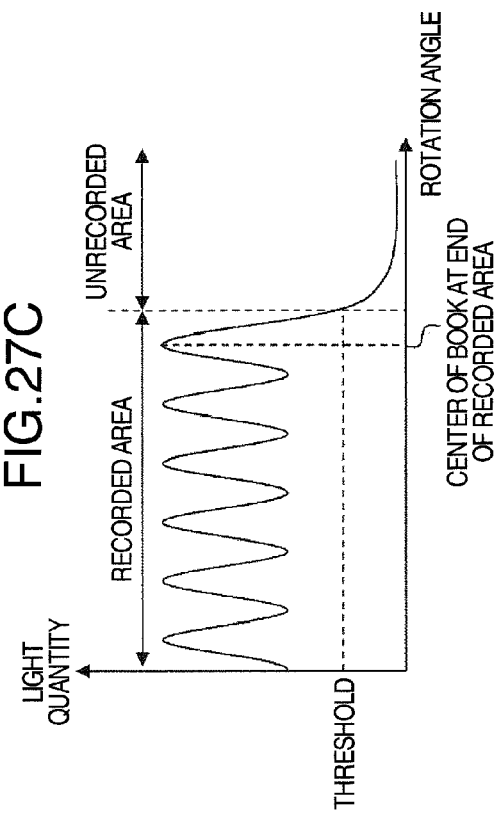
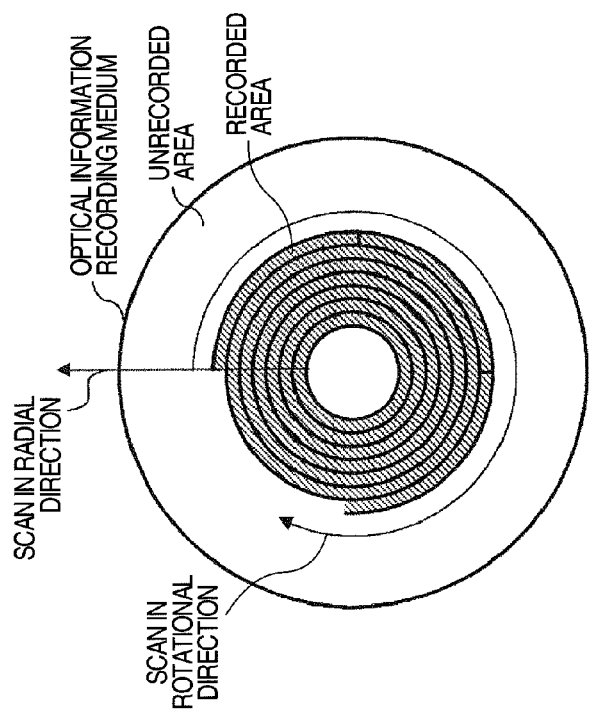

OPTICAL INFORMATION RECORDING AND REPRODUCING METHOD AND DEVICE

INCORPORATION BY REFERENCE

The present application claims priority from Japanese application JP2012-146305 filed on Jun. 29, 2012, the content of which is hereby incorporated by reference into this application.

BACKGROUND OF THE INVENTION

The present invention relates to a method and a device for recording or reproducing information to or from recording media by using holography.

Optical discs with a recording capacity of about 50 GB that conform to the Blu-ray Disc™ standard based on blue-violet semiconductor laser diodes have now become available also for consumer use. In the future, there will be a growing need to increase the optical disc capacity to as large as 100 GB to 1 TB, almost the same level as that of hard disk drives (HDD).

To realize such an ultrahigh density with optical discs, however, requires a new high density recording technology, different from the conventional one that involves shortening a wavelength of light and increasing a numerical aperture (NA) of an objective lens.

With studies on next generation storage technology currently under way, a hologram recording technology that records digital information by using holography is attracting attention.

The hologram recording technology records information in a recording media by overlapping a signal beam, which has information on page data modulated two-dimensionally by a spatial light modulator, on a reference beam in the interior of the recording media and causing an interference pattern produced by the beam overlapping operation to modulate a refractive index in the recording media.

For reproduction of information, the reference beam that was used for recording is thrown onto the recorded media to cause the hologram recorded in the media to work as a diffraction grating, producing a diffracted beam. This diffracted beam is reproduced as the same light as the recorded signal beam combined with phase information.

The reproduced signal beam is detected two-dimensionally at high speed by a light detector such as CMOS and CCD. As described above, the hologram recording technology allows two-dimensional information to be recorded in optical recording media at one time and then reproduced using a single hologram. Further, since a plurality of pieces of page data can be written one layer over the other at a desired location in the recording media, a large-capacity, high-speed recording and reproduction of information is assured.

In this hologram recording technology, US Publication 2006/0192866, the counterpart JP Publication of which is JP-A-2006-236536, describes a method that can deal with a situation where a spatial light modulator or a light detector in the recording/reproducing device has defects or where defects are produced as a result of use of the device. This patent literature describes a recording/reproducing device which "comprises: a reference beam emitting unit to shine a reference beam onto a hologram recording medium to read page data recorded in the hologram recording medium; a spatial light modulation unit to generate an information beam that is modulated by using spatial information corresponding to the page data to be written into the hologram recording medium; an information beam emitting unit to shine the information beam to the same area that is shone by the reference beam; a light detection unit to receive a reproduced light generated by the reference beam shone on the hologram recording medium; a known data storage unit to store known page data in advance; a defect examination unit to check defect positions on the spatial light modulation unit or light detection unit, first by writing the known page data in the hologram recording medium by shining on the hologram recording medium the information beam, which has been modulated by using the spatial information corresponding to the known page data, and the reference beam and second by reading the written known page data from a reproduced light that the light detection unit receives from the hologram recording medium by shining the reference beam on the medium; and a reproduction control unit to restore original data on defect positions, which is included in the reproduced light that the light detection unit has received, by using the information on the defect positions detected by the defect examination unit; wherein same data D4 as the known page data D3 stored in the known data storage unit is recorded in the hologram recording medium in advance; wherein a first defect position examination and a second defect position examination are executed, the first examination being done by the defect examination unit recording the known page data D3 in the hologram recording medium and then reading the recorded data D3', the second examination being done by the defect examination unit reading the data D4 recorded in advance in the hologram recording medium; wherein a decision unit is provided which, based on the information about the defect positions detected by the two defect position examinations, checks which of the spatial light modulation unit and the light detection unit has defects, so that the data on the defect positions can be restored by using the defect position information detected by the defect examination unit." "Even if the spatial light modulation unit or light detection unit has defects or if defects result through the use of the device, this recording/reproducing device therefore can correctly record or reproduce the defect position data in or from the hologram recording medium as long as the number of defects is within an allowable range. This recording/reproducing device also offers an improved yield, reduced production cost and high reliability in recording and reproducing user data."

SUMMARY OF THE INVENTION

The conventional recording and reproducing device has a drawback that if the detection of defect positions in optics components is made each time power of the recording/reproducing device is turned on, it takes a large amount of time before the device can be ready to record or reproduce information.

The object of this invention is to provide a device for recording or reproducing information in or from a recording medium by using holography, which can enter in a short period of time into a state where it can record or reproduce information, and which offers an improved yield and high reliability that ensures normal recording and reproduction even if defects occur in optics components associated with information recording and reproduction.

The problem described above is solved, for example, by recording the defect information on optics components in a recording medium or a memory in the device.

The information recording and reproducing device of this invention can be made ready in a short period of time to record or reproduce information and which can offer an improved yield and so high a reliability as to ensure normal recording and reproduction even if defects occur in optics components associated with information recording and reproduction.

Other objects, features and advantages of the invention will become apparent from the following description of the embodiments of the invention taken in conjunction with the accompanying drawings.

BRIEF DESCRIPTION OF THE DRAWINGS

FIGS. 6A-6C are diagrams showing example flows of operation of the optical information recording and reproducing device.

FIG. 8 is a block diagram showing an example embodiment of a signal processing circuit in the optical recording and reproducing device.

FIGS. 9A and 9B are diagrams showing example flows of operation of the signal generation circuit and the signal processing circuit.

FIG. 14 is a schematic diagram showing an interleaving.

FIG. 15 is a schematic diagram showing an interleaving.

FIG. 17 is a schematic diagram showing how bright defects in the light detector are treated in the reproduced signal processing.

FIGS. 27A-27C illustrate diagrams showing a relationship between recorded/unrecorded areas and light quantities detected during scan.

DESCRIPTION OF THE EMBODIMENTS

Now, embodiments of this invention will be described by referring to the accompanying drawings.

Embodiment 1

Figure 2:
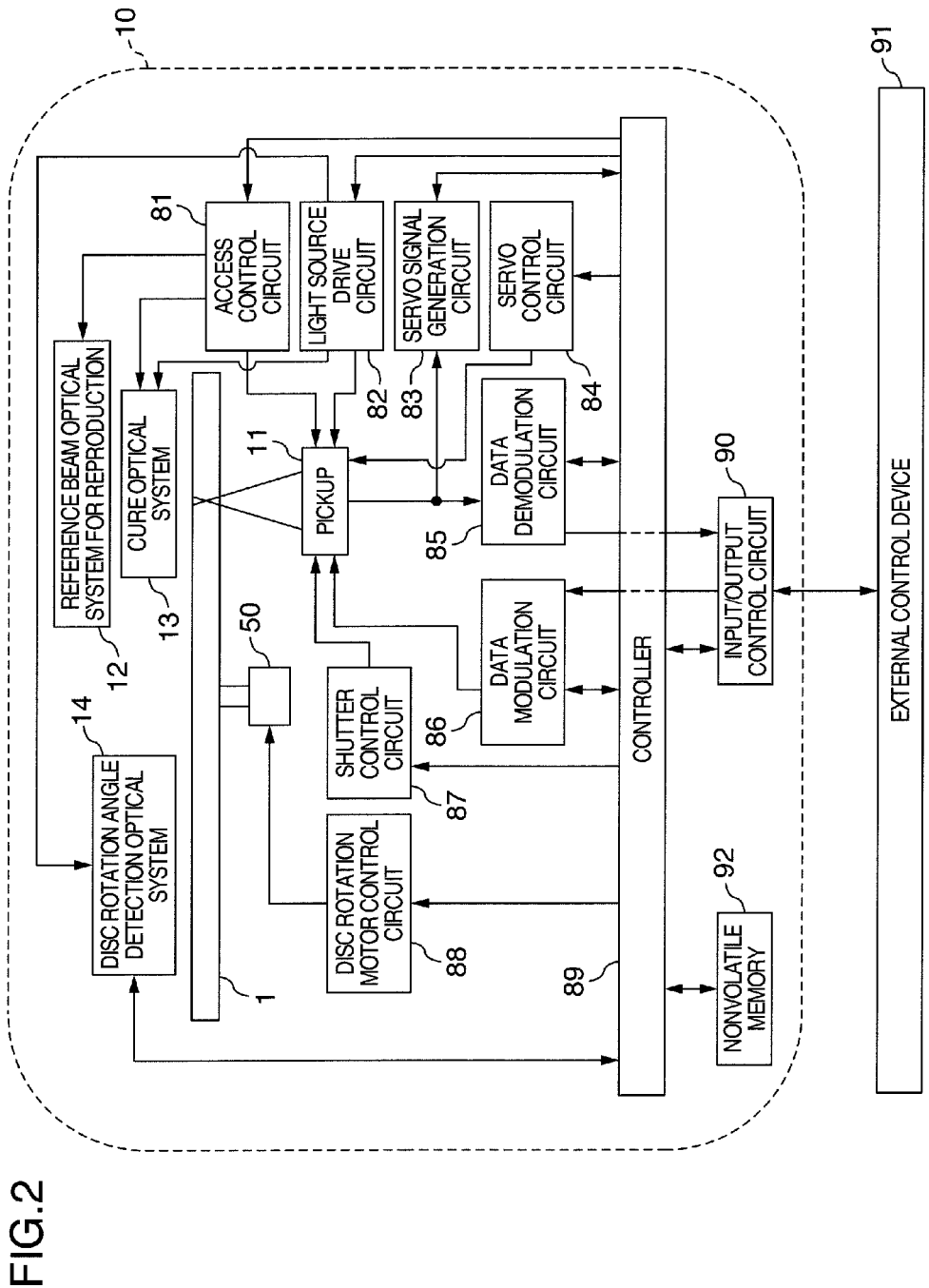
FIG. 2 is a block diagram showing an example embodiment of the optical information recording and reproducing device.

FIG. 2 represents a first embodiment of the invention, showing a block diagram of an optical information recording/reproducing device that records and/or reproduces digital information in or from optical recording media by using holography.

The optical information recording/reproducing device 10 is connected to an external control device 91 via an input/output control circuit 90. For recording, the optical information recording/reproducing device 10 receives at the input/output control circuit 90 an information signal to be recorded from the external control device 91. For reproduction, the optical information recording/reproducing device 10 sends reproduced information signal from the input/output control circuit 90 to the external control device 91.

The optical information recording/reproducing device 10 has a pickup 11, a reproduction reference beam optical system 12, a cure optical system 13, a disc rotation angle detection optical system 14 and a motor 50. The optical information recording medium 1 is rotated by the motor 50.

The pickup 11 throws a reference beam and a signal beam on the optical information recording medium 1 to record digital information in the medium through the use of holography. In this process, the information signal to be recorded is sent from a controller 89 through a data modulation circuit 86 to the pickup 11 where it is modulated by a spatial light modulator.

In reproducing the information recorded in the optical information recording medium 1, the reproduction reference beam optical system 12 generates a light wave that causes the reference beam from the pickup 11 to enter into the optical information recording medium in a direction opposite that in which the reference beam was applied when recording. Light produced as a result of the reproduction reference beam being applied to the medium is detected by a light detector, described later, in the pickup 11 and then processed by a data demodulation circuit 85 to reproduce the intended signal.

A nonvolatile memory 92 is used to hold information specific to the device, such as information on pixel defects of a spatial light modulator 312, pixel defects of a light detector 325 and an inclination of the pickup 11 relative to the motor 50.

The time during which to shine a reference beam and a signal beam onto the optical information recording medium 1 can be adjusted by the controller 89 controlling the open-close time of a shutter in the pickup 11 through a shutter control circuit 87.

The cure optical system 13 generates light beams for pre-curing and post-curing the optical information recording medium 1. The pre-cure is a step of applying a predetermined beam to a desired position in the optical information recording medium 1 where information is to be recorded, and is performed before the reference beam and the signal beam are shone on that desired position in the medium 1. The post-cure is performed after the information has been recorded at the desired position in the medium 1 and involves applying a predetermined beam to the same position to make it impossible to append any additional information at that position.

The disc rotation angle detection optical system 14 is used to detect the rotation angle of the optical information recording medium 1. In adjusting the optical information recording medium 1 to a predetermined rotation angle, the disc rotation angle detection optical system 14 detects a signal representing the rotation angle and, according to the detected signal, the controller 89 controls the rotation angle of the medium 1 through the disc motor control circuit 88.

A light source drive circuit 82 supplies predetermined light source drive currents to light sources in the pickup 11, the cure optical system 13 and the disc rotation angle detection optical system 14, so that these light sources can emit beams of predetermined light quantities respectively.

The pickup 11 and the cure optical system 13 have a mechanism that allows them to be slid radially of the optical information recording medium 1, with their positions being controlled through the access control circuit 81.

It is noted here that the recording technology based on the principle of angle-multiplexing of holography tends to have a very small allowable error for deviations of reference beam angle.

This makes it necessary to install a reference beam angle deviation detector in the pickup 11 and also provide in the optical information recording/reproducing device 10 a servo mechanism that includes a servo signal generation circuit 83 and a servo control circuit 84, the servo control circuit 84 correcting the angle deviations according to a servo control signal generated by the servo signal generation circuit 83 based on the detected angle deviations.

The pickup 11, the cure optical system 13 and the disc rotation angle detection optical system 14 may be constructed in a plurality of optical systems or unified in a single optical system.

Figure 3:
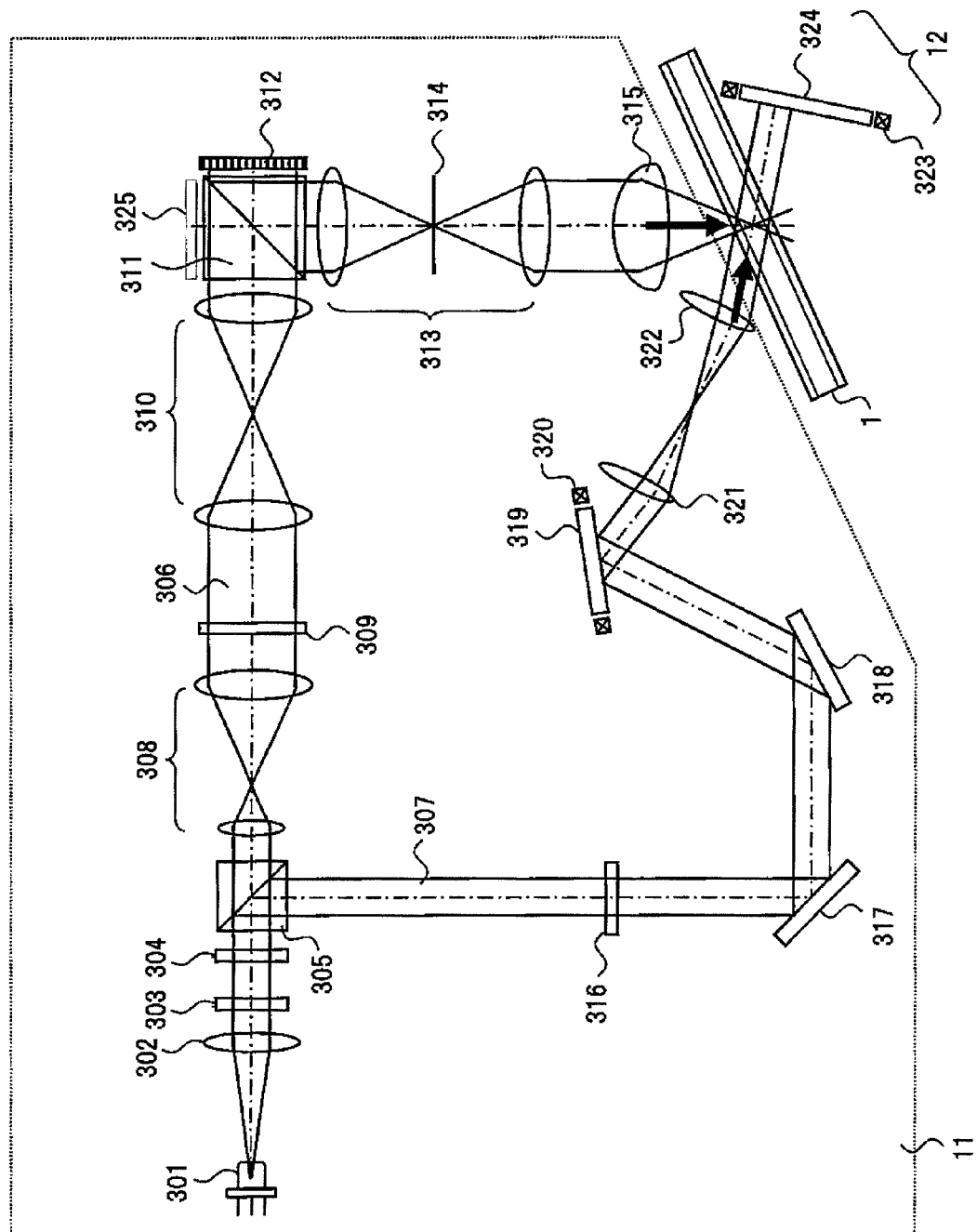
FIG. 3 is a schematic diagram showing an example embodiment of a pickup in the optical information recording and reproducing device.

FIG. 3 illustrates a principle of information recording in a basic optical system construction of the pickup 11 in the optical information recording/reproducing device 10. A light beam emitted from a light source 301 passes through a collimate lens 302 and enters into a shutter 303. When the shutter 303 is open, the beam, after passing through the shutter 303, is controlled in its polarization direction by an optics element 304 such as a half-wave plate so that it has a desired light quantity ratio between p-polarized light and s-polarized light, after which it enters into a PBS (Polarization Beam Splitter) prism 305.

Having passed through the PBS prism 305, the beam, which now functions as a signal beam 306, is enlarged in diameter by a beam expander 308 and then passes through a phase mask 309, a relay lens 310 and a PBS prism 311 before entering a spatial light modulator 312.

The signal beam, which has information appended to it by the spatial light modulator 312, is reflected by the PBS prism 311 to propagate through a relay lens 313 and a spatial filter 314. It is then focused on the optical information recording medium 1 by an objective 315.

Another beam reflected from the PBS prism 305, on the other hand, functions as a reference beam 307 and is set in a predetermined polarization direction by a polarization direction conversion element 316 depending on whether the operation is for recording or for reproduction, before reaching a galvano mirror 319 through mirrors 317 and 318. The galvano mirror 319 with its angle adjustable by an actuator 320 can set an angle of the reference beam incident on the optical information recording medium 1 after passing through lenses 321 and 322 to a desired one. The setting of the incidence angle of the reference beam may be accomplished by using another element, instead of the galvano mirror, which changes a wavefront of the reference beam.

As described above, by throwing the signal beam and the reference beam overlappingly into the optical information recording medium 1, an interference fringe pattern is formed in the medium. This pattern is recorded in the recording medium, causing information to be written into the medium. Further, because the incidence angle of the reference beam as it enters the optical information recording medium 1 can be changed by the galvano mirror 319, information can be recorded through angle multiplexing.

In descriptions that follow, in a hologram that is recorded in one area by changing the angle of reference beam thrown onto that same area, each component sheet of the hologram corresponding to an associated reference beam angle is referred to as a page, and a set of angle-multiplexed pages in the same area as a book.

Figure 4:
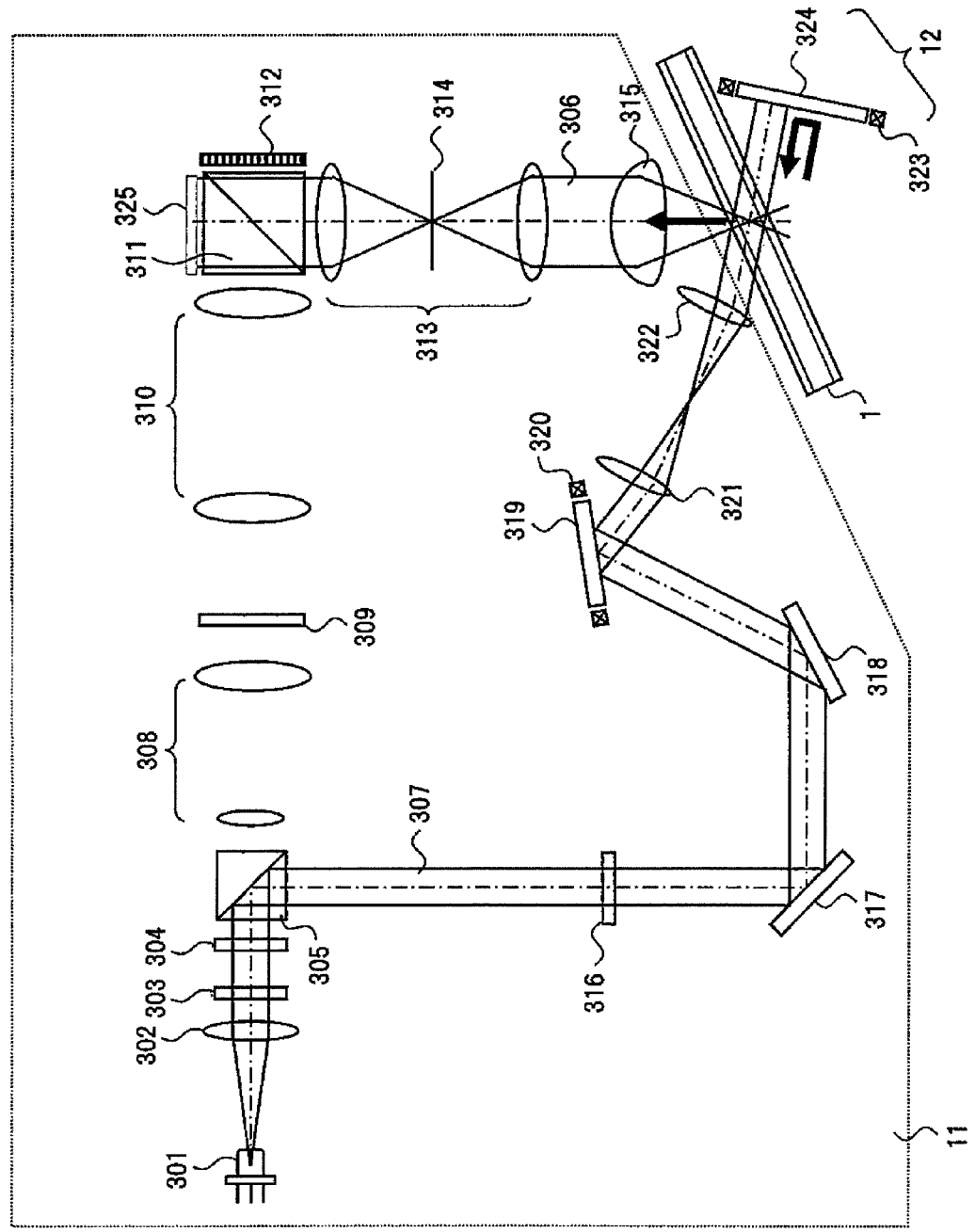
FIG. 4 is a schematic diagram showing another embodiment of the pickup in the optical information recording and reproducing device.

FIG. 4 illustrates a principle of information reproduction in a basic optical system construction of the pickup 11 in the optical information recording/reproducing device 10. In reproducing recorded information, a reproduction reference beam is generated by throwing a reference beam onto the optical information recording medium 1 and causing the reference beam that has passed through the medium 1 to be reflected by a galvano mirror 324 whose angle can be adjusted by an actuator 323.

The reproduction reference beam, when applied to the medium 1, produces a reproduction beam, which propagates through the objective 315, the relay lens 313 and the spatial filter 314. The reproduction beam then passes through the PBS prism 311 into the light detector 325 which can reproduce the recorded signal. For the light detector 325, any imaging device, such as CMOS image sensor or CCD image sensor, may be used as long as it can reproduce page data.

Figure 5:
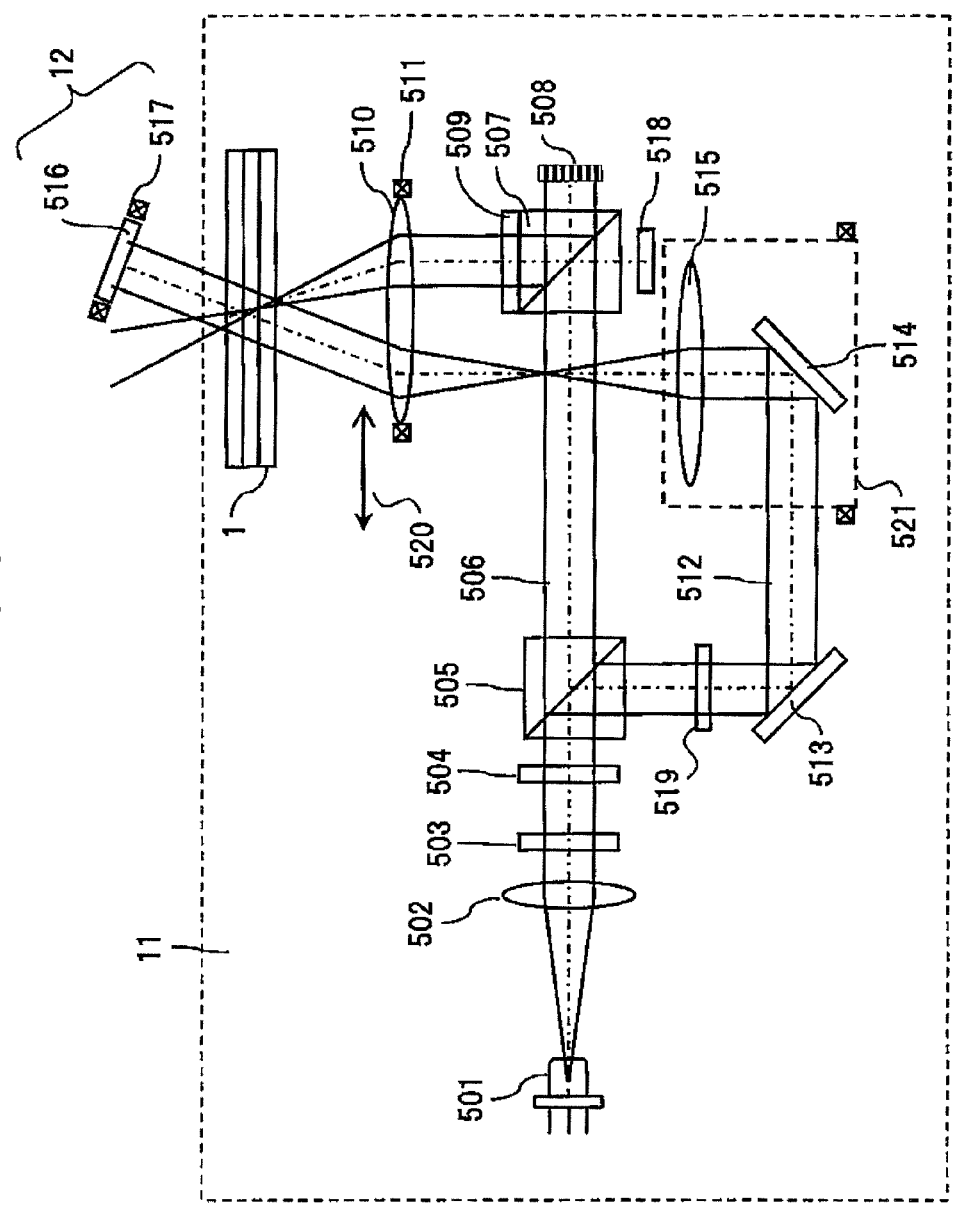
FIG. 5 is a schematic diagram showing still another embodiment of the pickup in the optical information recording and reproducing device.

FIG. 5 represents another construction of the pickup 11. In FIG. 5, a light beam emitted from a light source 501 passes through a collimate lens 502 and enters into a shutter 503. When the shutter 503 is open, the beam passes through the shutter 503 and is controlled in its polarization direction by an optics element 504 such as a half-wave plate so that it has a desired light quantity ratio between p-polarized light and s-polarized light, before entering into a PBS prism 505.

After passing through the PBS prism 505, the beam further propagates through a PBS prism 507 into a spatial light modulator 508. A signal beam 506 that has information appended to it by the spatial light modulator 508 is reflected by the PBS prism 507 and passes through an angle filter 509 that allows only a beam of a predetermined incidence angle to pass therethrough. Then, the signal beam is focused by an objective 510 onto the optical information recording medium 1.

The beam that was reflected by the PBS prism 505 functions as a reference beam 512 and is set in a predetermined polarization direction by a polarization direction conversion element 519 depending on whether the operation is for recording or for reproduction, before entering into a lens 515 through mirrors 513 and 514. The lens 515 focuses the reference beam 512 on a back focus plane of the objective 510. The reference beam, which was focused on the back focus plane of the objective 510, is collimated once again by the objective 510 before entering the optical information recording medium 1.

It is noted here that the objective 510 or an optics block 521 can be driven, for example, in a direction indicated by an arrow 520. Shifting the position of the objective 510 or optics block 521 in the drive direction 520 changes a relative positional relationship between the objective 510 and a focused light spot on the back focus plane of the objective 510, allowing the incidence angle of the reference beam falling on the hologram recording medium 1 to be set to a desired one. Instead of driving the objective 510 or optics block 521, the mirror 514 may be driven by an actuator to set the incidence angle of the reference beam to a desired angle.

As described above, the signal beam and the reference beam are thrown onto the hologram recording medium 1 in a way that causes them to overlap each other in the medium, forming an interference fringe pattern in the medium. This pattern is then recorded in the recording medium, causing information to be written into the medium. Further, since the incidence angle of the reference beam falling on the optical information recording medium 1 can be changed by shifting the position of the objective 510 or optics block 521, information can be recorded through angle multiplexing.

The reproduction of the recorded information, as described above, consists in shining the reference beam on the hologram recorded medium 1 and reflecting the beam that has passed through the medium 1 by a galvano mirror 516 to produce a reproduction reference beam. The reproduced beam generated by the application of the reproduction reference beam propagates through the objective 510 and the angle filter 509. The reproduced beam then passes through the PBS prism 507 and enters a light detector 518, reproducing the recorded signal.

The optical system shown in FIG. 5 has a construction in which the signal beam and the reference beam are introduced into the same objective. This offers an advantage of being able to achieve a significant size reduction, when compared with the optical system construction shown in FIG. 3.

FIGS. 6A-6C show flows of recording and reproduction operations performed by the optical information recording/reproducing device 10. Here we will describe, in particular, flows of recording and reproducing operations using holography.

FIG. 6A shows an operation flow from when an optical information recording medium 1 is inserted into the optical information recording/reproducing device 10 until the preparation for recording or reproduction is complete. FIG. 6B shows an operation flow from a preparation complete state to the recording of information in the optical information recording medium 1. FIG. 6C shows an operation flow from the preparation complete state to the reproduction of information recorded in the medium 1.

When a medium is inserted (601), as shown in FIG. 6A, the optical information recording/reproducing device 10 checks the inserted disc to see if the medium is intended for recording or reproducing digital information using holography (602).

If the disc check finds that the inserted disc is an optical information recording medium for recording or reproducing digital information using holography, the optical information recording/reproducing device 10 reads control data from the medium and retrieves, for example, information on the optical information recording medium 1; information on recording and reproducing operations performed by the optical information recording/reproducing device 10; environmental information, including various settings and conditions of recording and reproduction operations, temperature, humidity and date and time during recording and reproducing operations; information on physical addresses and logical addresses; media format information; defect position information and information on substitute areas (603).

After the control data has been read, the optical information recording/reproducing device 10 makes various adjustments and performs a precise setup, on the pickup 11 according to the control data (604). Now, the preparation for recording or reproduction operation is complete (605).

The operation flow from when the preparation is complete until the information is recorded is as shown in FIG. 6B. First, data to be recorded is received (611) and information associated with the received data is sent to a spatial light modulator in the pickup 11.

Then, to allow for high quality information recording in the optical information recording medium, the recording/reproducing device performs in advance a variety of recording power adjustment, including an optimization of power of the light source 301 and an optimization of exposure time of the shutter 303 (612), as necessary.

Then, a seek operation (613) is done which involves controlling the access control circuit 81 to put the pickup 11 and the cure optical system 13 at their predetermined positions on the optical information recording medium 1. When the medium 1 has address information, the seek operation generates their address information and checks if they are located at their intended positions. If they are found to be located at other than their intended positions, the seek operation calculates discrepancies between their actual positions and intended ones and repositions them accordingly. This operation is repeated.

After this, by using a light beam emitted from the cure optical system 13, the recording/reproducing device precures a predetermined area of the medium (614) and, by using a reference beam and a signal beam emitted from the pickup 11, records data in the medium (615).

After the data is recorded, the recorded area of the medium is post-cured using a beam emitted from the cure optical system 13 (616). The data may be verified as circumstances demand.

The operation flow from when the preparation is complete until the information is reproduced is as shown in FIG. 6C. First, a seek operation (621) controls the access control circuit 81 to put the pickup 11 and the reproduction reference beam optical system 12 at their predetermined positions on the optical information recording medium 1. When the optical information recording medium 1 has address information, the seek operation generates their address information to check if they are located at their intended positions. If they are found to be located at other than their intended positions, the seek operation calculates discrepancies between their actual positions and intended ones and repositions them accordingly. This operation is repeated.

Then, the reference beam is emitted from the pickup 11 to read information recorded in the optical information recording medium 1 (622) and the reproduced data is transmitted (613).

Figure 1A:
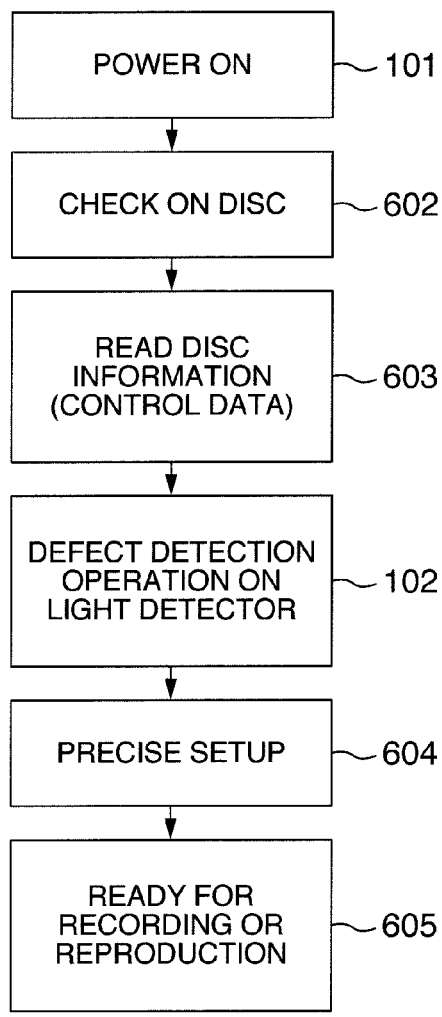
FIGS. 1A and 1B are diagrams showing example flows of operation of an optical information recording and reproducing device.
Figure 1B:
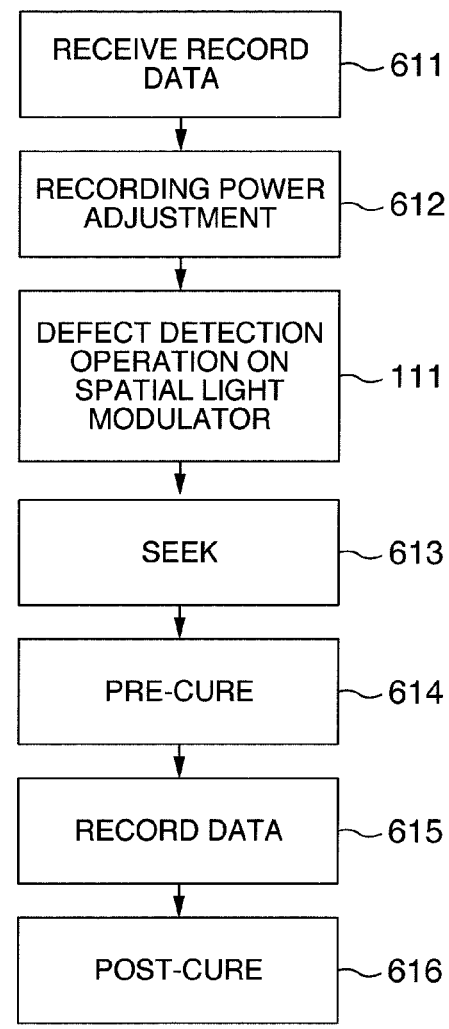

FIGS. 1A and 1B, similar to FIGS. 6A and 6B, show flows of recording and reproducing operations in the optical information recording/reproducing device 10. FIG. 1A shows an operation flow from turning on the power of the optical information recording/reproducing device 10 with the recording medium 1 inserted therein until the preparation for recording or reproduction is complete. FIG. 6B shows an operation flow from when the recording/reproducing device is ready until the recording medium 1 is first recorded with information.

When, as shown in FIG. 1A, the power is turned on (101), the optical information recording/reproducing device 10 performs a disc check to see whether the inserted medium is a medium for recording or reproducing digital information using holography (602). If the disc check finds that the inserted medium is a medium for recording or reproducing digital information using holography, the recording/reproducing device 10 reads the control data written in the medium which includes defect information on the spatial light modulator 312 of the device and positions of defects, or defect positions and kinds (603). Where the optical information recording medium has been recorded by a plurality of recording devices, the control data has two or more pieces of the defect information on the spatial light modulator 312, which are matched to their corresponding addresses on the medium.

After the control data has been read, the recording/reproducing device performs a defect detection operation 102 on the light detector. The defect detection operation 102 on the light detector may be largely classified into two methods. The first is a method of reading defect information on the light detector 325 stored in advance in a nonvolatile memory 92 of the recording/reproducing device 10. The second is a method that involves reproducing a hologram recorded in the recording medium and searching for the positions and kinds of defects in the light detector 325. The defect information on the light detector 325 stored in the nonvolatile memory 92 may be stored during the mass production of the memories, or the defect information that has been searched by reproducing the hologram recorded in the medium may be stored in the memory as it is found.

After the control data has been read, a variety of adjustments and the precise setups on the pickup 11 are performed according to the control data (604). Now, the optical information recording/reproducing device 10 is ready for information recording or reproduction (605).

The operation flow from when the preparation is complete until information first recorded is as shown in FIG. 1B. First, data to be recorded is received (611) and information associated with the received data is sent to a spatial light modulator in the pickup 11.

Then, to ensure high quality recording of information in the optical information recording medium, the recording/reproducing device performs in advance a variety of recording power adjustment, including an optimization of power of the light source 301 and an optimization of exposure time of the shutter 303 (612) as required.

After the recording power adjustment, a defect detection operation 111 is performed on the spatial light modulator 312. The defect detection operation on the spatial light modulator 312 may be largely classified into two methods. The first is a method of reading defect information on the spatial light modulator 312 stored in advance in a nonvolatile memory 92 of the recording/reproducing device 10. The second is a method that involves reproducing a hologram recorded in the recording medium and searching for the positions and kinds of defects in the spatial light modulator 312. The defect information on the spatial light modulator 312 stored in the nonvolatile memory 92 may be stored during the mass production of the memories, or the defect information that has been searched by reproducing the hologram recorded in the medium may be stored in the memory as it is found.

After this, a seek operation (613) is done which involves controlling the access control circuit 81 to put the pickup 11 and the cure optical system 13 at their predetermined positions on the optical information recording medium 1. A predetermined area is pre-cured by using a beam emitted from the cure optical system 13 (614) and is recorded with data by using a reference beam and a signal beam both emitted from the pickup 11 (615). After the data is recorded, the same area is post-cured using a beam emitted from the cure optical system 13 (616). The data may be verified as circumstances demand.

FIG. 26 is a schematic diagram representing an embodiment of the optical information recording medium 1 and a bookcase 2.

Figure 26B:
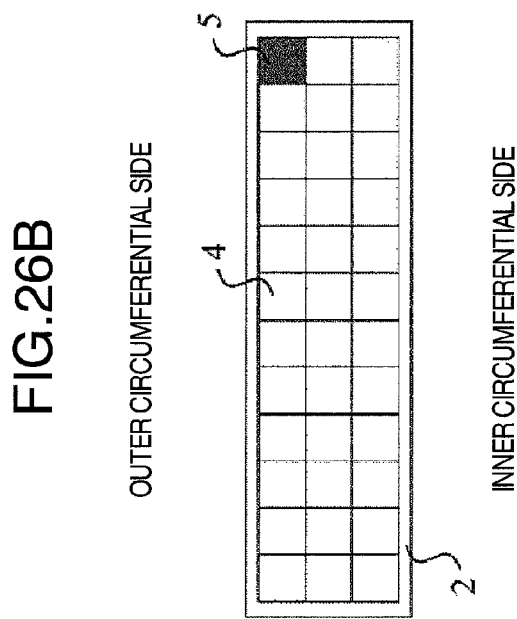
FIGS. 26A and 26B are schematic diagrams showing an optical information recording medium and a bookcase.
Figure 26A:
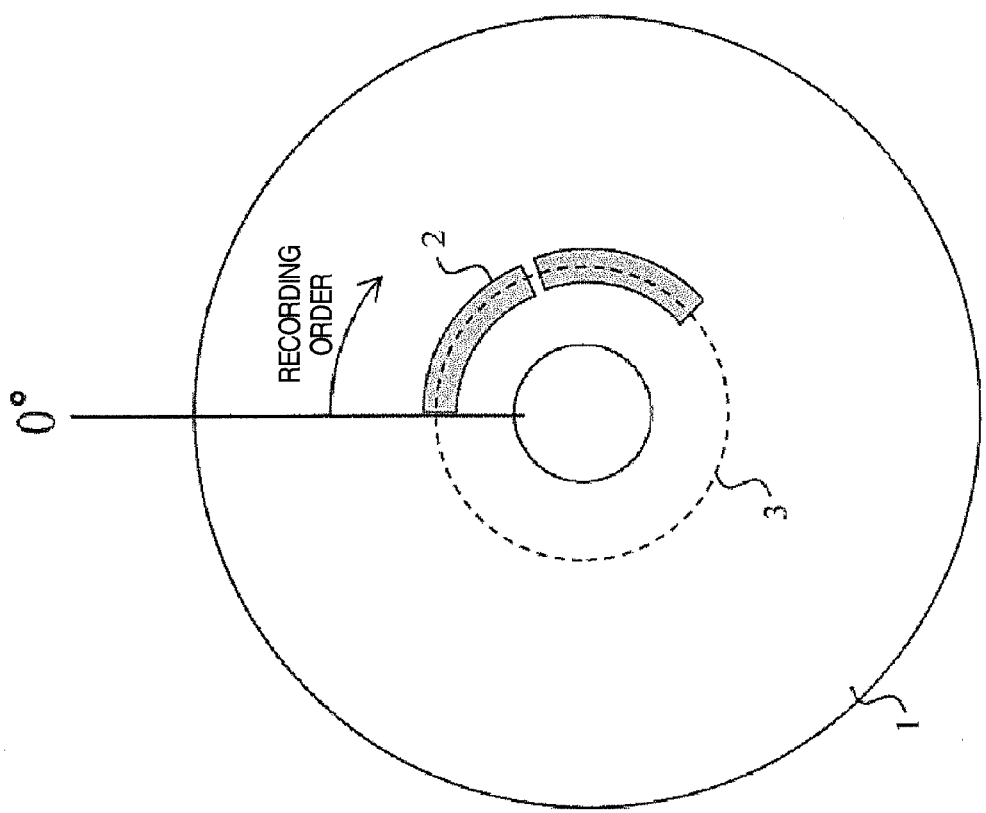

FIG. 26A shows an outline of the optical information recording medium 1 of this embodiment. The medium 1 has concentric tracks 3 formed thereon, in which the bookcase 2 is recorded. The bookcase 2 is a minimum recordable unit that can be recorded during a recording session. The bookcase 2, or minimum recordable unit, is subject to the process of being pre-cured (614), recorded with data by using a reference beam and a signal beam (615), and then post-cured (616). The bookcase 2 is constructed of a plurality of books 4. Between the adjoining bookcases 2, a gap is provided as shown. When the optical information recording medium 1 is recorded, data are written into the bookcases 2 clockwise beginning with the innermost track 3. When a bookcase 2 is first recorded in any track 3, the recording starts at a predetermined rotary angle position of the medium 1. In the diagram, for example, a straight line at an angle of 0° represents a recording start position for each track 3.

FIG. 26B shows an outline of the bookcase 2 of this embodiment. The bookcase 2 has a plurality of books 4. A book 4 at the right end of the bookcase 2 on the outermost circumference side is used as a management area 5, in which the control data is recorded.

A method of searching through the management area 5 will be explained. Since the management area 5 is located at the end of the bookcase 2 as described above, a boundary between a recorded area and an unrecorded area need only be searched. FIGS. 27A-27C are schematic diagrams showing a relationship between the locations of recorded and unrecorded areas and light quantities detected by scanning.

FIG. 27A shows recorded and unrecorded areas in the optical information recording medium 1. It is assumed that concentric recorded areas spread from the inner circumference toward the outer circumference of the medium and that the outermost circumference of the recorded areas ends halfway in the rotary angle.

FIG. 27B shows light quantities obtained during the process of determining an outermost circumference of the recorded areas by shifting the angle of reference beam in a direction perpendicular to the angle multiplexing and then radially scanning the light quantity. When the recorded areas are scanned, the light quantity detected is always higher than a threshold, with a peak emerging each time a scan point passes a book 4. When the scan point moves beyond the outermost circumference of the recorded areas, the light quantity falls below the threshold. Upon detecting the lower-than-the-threshold light quantity, it is decided that the position of the last peak detected represents the outermost circumference of the recorded area, i.e., the last recorded bookcase 2.

FIG. 27C shows light quantities obtained when determining an end of the recorded areas by scanning the light quantity in the direction of rotation. When the recorded areas are scanned, the light quantity detected is always higher than a threshold, with a peak appearing each time a scan point passes a book 4. When the scan point goes beyond the outermost circumference of the recorded areas, the light quantity falls below the threshold. Upon detecting the lower-than-the-threshold light quantity, it is decided that the position of the last peak detected represents the end of the recorded areas.

As described above, scanning the light quantity by shifting the angle of reference beam in a direction perpendicular to the angle multiplexing enables a boundary between the recorded and unrecorded areas to be detected stably, which in turn makes it possible to search the management information in the management area 5 recorded at the end of the bookcase 2.

FIGS. 9A and 9B show data processing flows during recording and during reproduction. FIG. 9A represents a flow of recording data processing by the data modulation circuit 86 after the recording data receiving operation 611 has been done by the input/output control circuit 90 until the data is converted into two-dimensional data on the spatial light modulator 312. FIG. 9B represents a flow of reproduced data processing by the data demodulation circuit 85 after the two-dimensional data has been detected by the light detector 325 until the input/output control circuit 90 performs the reproduced data transmission operation 624.

The data processing during recording will be explained by referring to FIG. 9A. When user data is received (901), the data is subjected to the following processing. It is divided into a plurality of data sequences, each of which is then attached with a CRC code to allow for error detection during reproduction (902); on-pixel number and off-pixel number are made almost equal and the data sequences are scrambled by adding to them strings of pseudorandom numbers to prevent a possible repetition of the same pattern (903); error correction coding, such as Reed-Solomon coding, is performed on the scrambled data sequences to allow for error correction during reproduction (904); and then the data sequences are converted into M×N two-dimensional data while at the same time subjecting them to an interleaving operation for spreading of errors and this operation is repeated for one page of data to produce one page of two-dimensional data (905). To the two-dimensional data produced in this way is added a marker (906) which is used as criteria for the image position detection and image distortion correction during reproduction. The two-dimensional data attached with the marker is then transferred to the spatial light modulator 312 (907).

Next, the flow of data processing during reproduction will be explained by referring to FIG. 9B. Image data detected by the light detector 325 is transferred to the data demodulation circuit 85 (911). The position of the image is detected by using the marker included in the image data as a reference (912). A resampling is done, in which corrections are made of inclination, magnification and distortion (913) by taking the positions, as well as the kinds, of defects of the light detector 325 into account. After this, a binarization operation (914) is carried out and then the marker is removed (915), thus acquiring one page of two-dimensional data (916). The two-dimensional data thus obtained is deinterleaved into a plurality of data sequences. Then an error correction is performed which corresponds to a loss correction that handles defect positions of the spatial light modulator 312 in the recording/reproducing device as known error positions (917), after which parity data sequences are removed. Next, a descrambling operation (918) and an error detection operation using CRC (919) are performed, after which CRC parities are deleted. Then the user data is transmitted via the input/output control circuit 90 (920).

Figure 11:
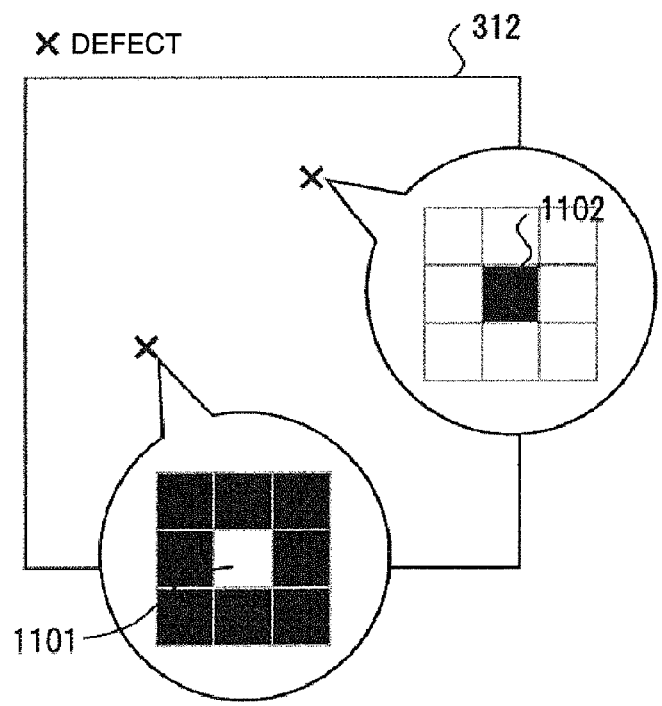
FIG. 11 is a schematic view showing defects in a spatial light modulator.
Figure 12:
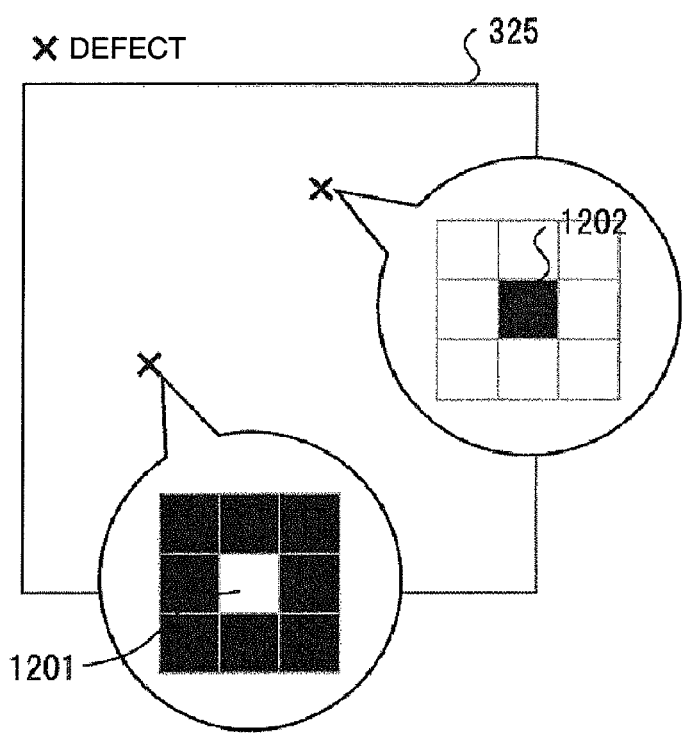
FIG. 12 is a schematic view showing defects in a light detector.

FIG. 11 shows kinds of defects in the spatial light modulator 312. When two-dimensional data with all pixels turned off is displayed on the spatial light modulator, those pixels that light up as brightly as on-pixels are called bright defects 1101 of the spatial light modulator 312. When two-dimensional data having all pixels turned on is displayed, those pixels that light up as dimly as off-pixels are called dark defects 1102 of the spatial light modulator 312. FIG. 12 shows kinds of defects in the light detector 325. When two-dimensional data with all pixels turned off is displayed on the light detector 325, those pixels that are detected to light up as brightly as on-pixels are called bright defects 1201 of the light detector 325. When two-dimensional data with all pixels turned on is displayed, those pixels that light up as dimly as off-pixels are called dark defects 1202.

Figure 13:
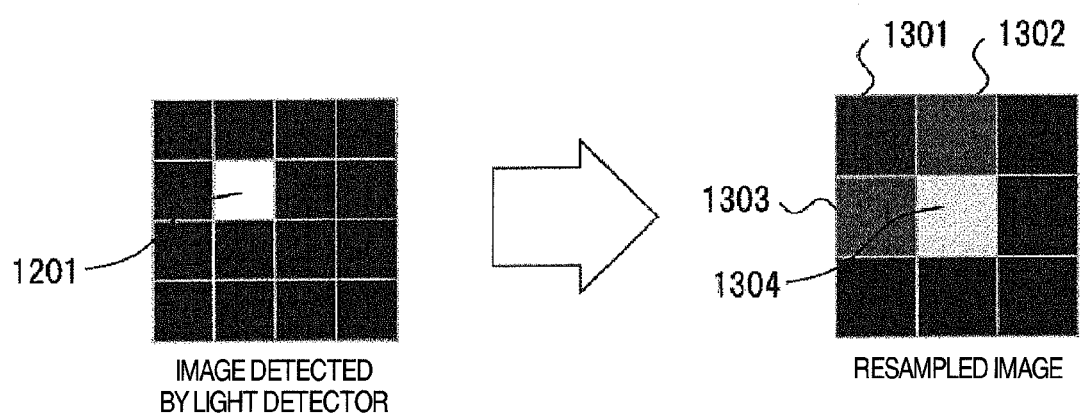
FIG. 13 is a schematic view showing an image produced by resampling a detected image on the light detector.

FIG. 13 shows effects that the bright defects 1201 of the light detector 325 has on the two-dimensional data after being resampled. A recorded image is detected by the spatial light modulator 312 with 1-2 times oversampling, so the bright defect 1201 affects four pixels (1301, 1302, 1303, 1304).

Figure 16:
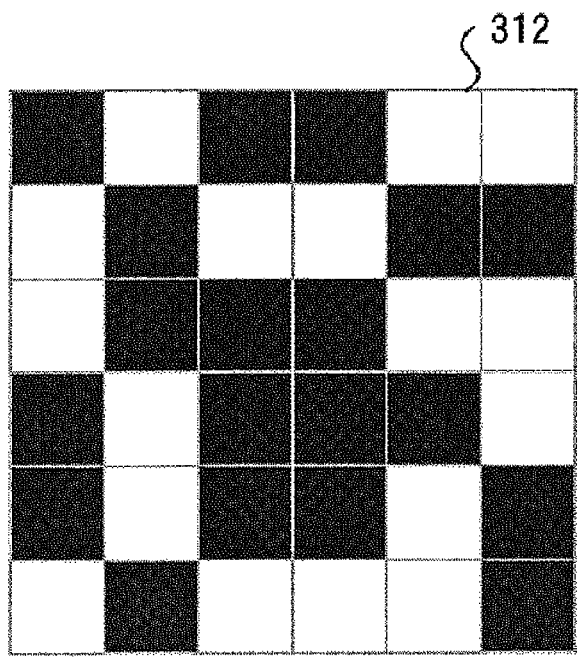
FIG. 16 is a schematic diagram showing two-dimensional data.

FIG. 17 shows how a detected image is handled when the two-dimensional data of the spatial light modulator 312 of FIG. 16 is detected by the light detector 325 with bright defects 1701. In the resampling operation that corrects inclination, magnification and distortion of an image (913), the bright defects 1701 of the light detector 325 are treated as a median value 1702 between an on-pixel and an off-pixel, as shown to the right. This operation is similarly applied not just to the bright defects 1201 but also to the dark defects 1202. In subsequent resampling operations, because pixel values of resampled two-dimensional data are determined along with surrounding pixels, the use of median values for the pixel values can minimize the effect of errors, as shown in FIG. 13, reducing the rate of errors included in the two-dimensional data prior to the error correction operation.

In the error correction operation (917), the bright defects 1101 and dark defects 1102 of the spatial light modulator 312 are subjected to a loss correction that, by using position information, handles the defect positions as known error positions. This reduces the rate of errors included in the two-dimensional data after the error correction operation. FIG. 14 and FIG. 15 show interleaving that spreads errors of data sequences and which forms the error correction codes (904). In the example of FIG. 14, data is distributed among six sub-blocks, one symbol at a time, in a direction from upper left to upper right and from top to bottom to form two-dimensional data. The interleaving shown in FIG. 15 distributes data among the six sub-blocks, one symbol at a time, while shifting the first position in each sub-block to form two-dimensional data. The interleaving shown in FIG. 14 is referred to as a first interleave method and the one shown in FIG. 15 as a second interleave method. If defect positions of the spatial light modulator 312 are already known at the time of recording, an appropriate interleaving method is selected which uniformly scatters the defect positions of the spatial light modulator 312 among error correction codes forming the two-dimensional data. This is done for the purpose of utilizing the error correction capability of the error correction operation (917) to the greatest possible extent. Information that identifies the interleave method used in recording page data, is recorded in the control data together with defect information. The information identifying the interleave method may also be recorded as part of data that forms each page of data.

Figure 7:
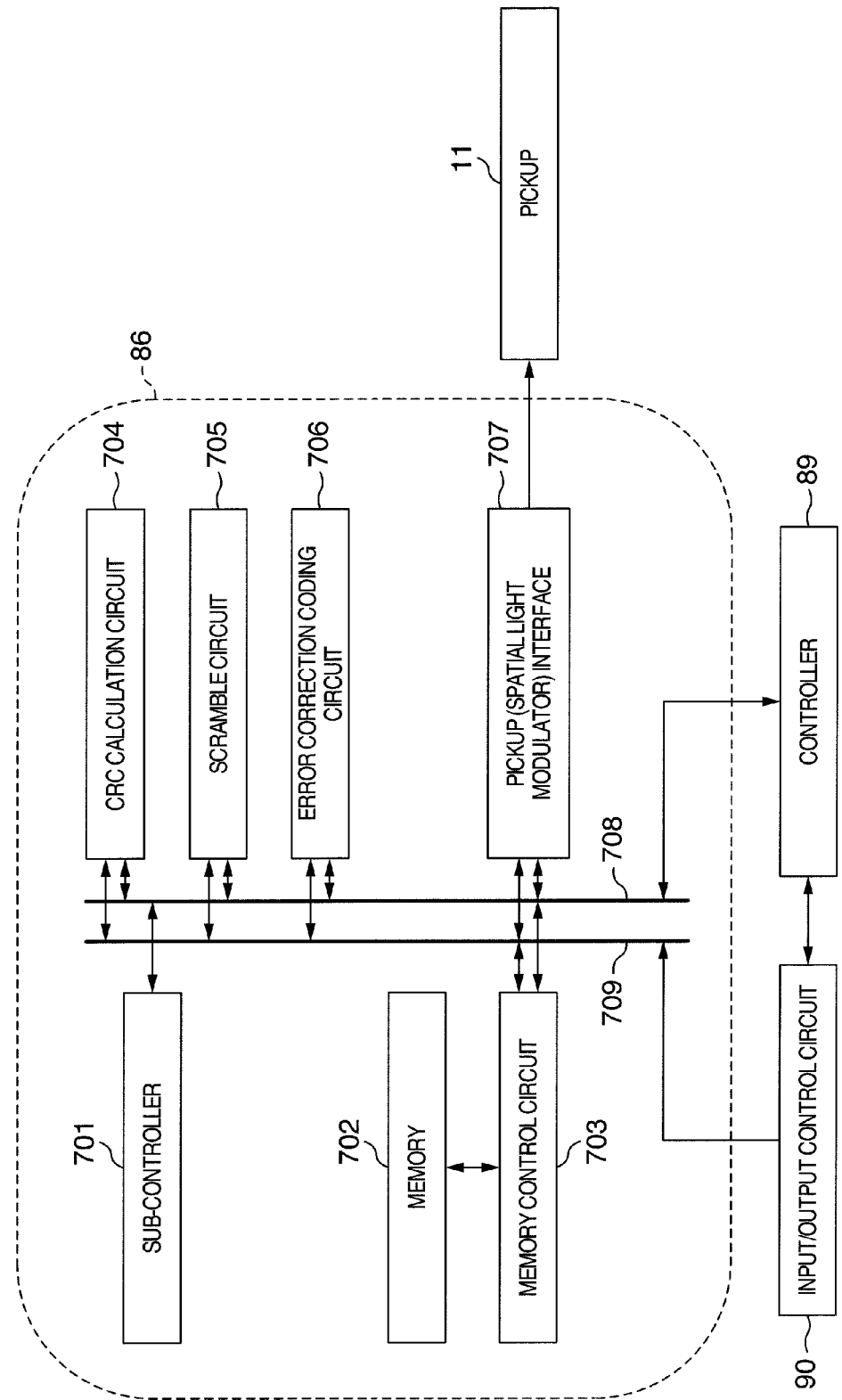
FIG. 7 is a block diagram showing an example embodiment of a signal generation circuit in the optical recording and reproducing device.

FIG. 7 is a block diagram of the data modulation circuit 86 in the optical information recording/reproducing device 10.

When user data begins to be input to the input/output control circuit 90, the input/output control circuit 90 notifies the controller 89 that the inputting of user data has begun. Upon reception of this notification, the controller 89 causes the data modulation circuit 86 to record one page of data supplied from the input/output control circuit 90. A record command from the controller 89 is sent via a control line 708 to a sub-controller 701 in the signal generation circuit 86. On receiving this command notification, the sub-controller 701 controls associated signal processing circuits via the control line 708 to operate them parallelly. First, the sub-controller 701 controls a memory control circuit 703 to store the user data received from the input/output control circuit 90 through a data line 709 into a memory 702. When the user data stored in the memory 702 reaches a predetermined volume, a CRC calculation circuit 704 converts the user data into CRC codes. Next, the CRC-coded data is scrambled by a scramble circuit 705 adding a pseudorandom number sequence to it. The scrambled data then undergoes an error correction coding by which a parity data sequence is added to it by an error correction coding circuit 706. As a final step, the sub-controller 701 causes a pickup interface circuit 707 to read the error correction coded data from the memory 702 in the order in which the two-dimensional data is arranged on the spatial light modulator 312, and to add to the coded data a marker, which functions as a reference during reproduction operation, before transferring the two-dimensional data to the spatial light modulator 312 in the pickup 11.

FIG. 8 is a block diagram of the data demodulation circuit 85 in the optical information recording/reproducing device 10.

When the light detector 325 in the pickup 11 detects image data, the controller 89 requests the data demodulation circuit 85 to reproduce one page of data supplied from the pickup 11. The command from the controller 89 is notified via a control line 811 to the sub-controller 801 in the data demodulation circuit 85. Upon receiving this notification, the sub-controller 801 controls associated processing circuits through a control line 811 to operate them parallelly. First, the sub-controller 801 causes a memory control circuit 803 to store into a memory 802 image data supplied from the pickup 11 through a pickup interface circuit 810 and a data line 812. When the data stored in the memory 802 reaches a predetermined volume, an image position detection circuit 809 detects a marker from the image data stored in the memory 802 to extract a valid data range. Next, using the detected marker, an image distortion correction circuit 808 corrects inclination, magnification and distortion of the image and converts the image data into a desired size of two-dimensional data. Bit data making up the size-converted two-dimensional data are binarized by a binarization circuit 807 and the binarized data is stored in the memory 802 in the order in which the reproduced data is output. Next, an error correction circuit 806 corrects errors included in data sequences; the data is descrambled by a descramble circuit 805 removing the pseudorandom number sequence from the data; and then a check is made by a CRC calculation circuit 804 to confirm that no errors are contained in the user data on the memory 802. After this, the user data is transferred from the memory 802 to the input/output control circuit 90.

Figure 10:
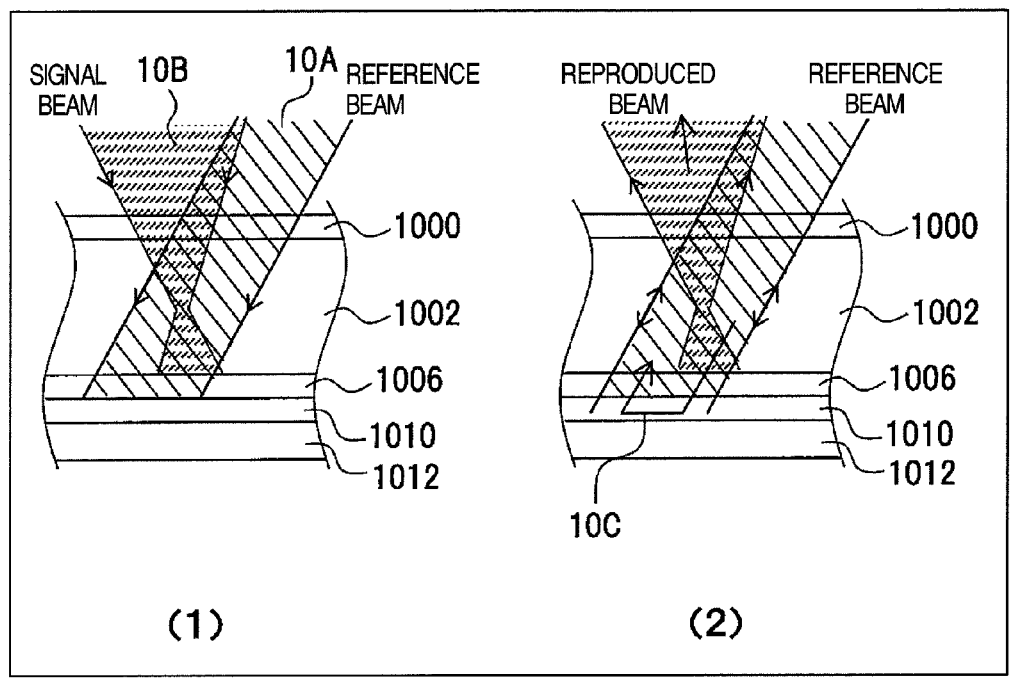
FIG. 10 is a schematic diagram showing an example embodiment of a layer structure of an optical information recording medium with a reflection layer.

FIG. 10 shows a layer structure of an optical information recording medium with a reflection layer. (1) represents a state in which information is being recorded in the optical information recording medium, and (2) represents a state in which information is being reproduced from the optical information recording medium.

The optical information recording medium 1 has, from the pickup 11 side, a transparent cover layer 1000, a recording layer 1002, a light absorbing/transmission layer 1006, a light reflection layer 1010 and a third transparent protective layer 1012. An interference fringe pattern produced by a reference beam 10A and a signal beam 10B is recorded in the recording layer 1002.

The light absorbing/transmission layer 1006 absorbs the reference beam 10A and the signal beam 10B during the information recording operation and, during the information reproducing operation, changes its property to allow the reference beam to pass therethrough. For example, applying a voltage to the optical information recording medium 1 causes the light absorbing/transmission layer 1006 to change its state between colored and colorless states. That is, during the information recording operation the light absorbing/transmission layer 1006 assumes a colored state absorbing the reference beam 10A and the signal beam 10B that have passed through the recording layer 1002. During the information reproducing operation it assumes a colorless state, allowing the reference beam to pass therethrough (T. Ando et. al.: Technical Digest ISOM (2006), Th-PP-10). The reference beam 10A that has passed through the light absorbing/transmission layer 1006 is reflected by the light reflection layer 1010 to become a reproduction reference beam 10C.

It is noted that $WO_3$ which is described in Technical Digest ISOM (2006), Mo—B-04, by A. Hirotsune et. al. may be used in the light absorbing/transmission layer 1006 as an electrochromic (EC) material.

By applying a voltage to this material it can be made to reversibly change its state between the colored and the colorless state. More specifically, during the information recording operation, the material is set to the colored state to absorb light. During the information reproducing operation, it is set to the colorless state to let light pass through.

The construction of FIG. 10 obviates the optical system for reproduction reference beam, allowing for a size reduction of the drive.

Here, the defect detection operation 102 on the light detector and the defect detection operation 111 on the spatial light modulator shown in the FIG. 1A and FIG. 1B will be explained in detail.

As an example of the defect detection operation 102 on the light detector, there is a method which reproduces a hologram recorded in the optical information recording medium 1 to find positions and kinds of defects in the light detector 325.

Figure 18:
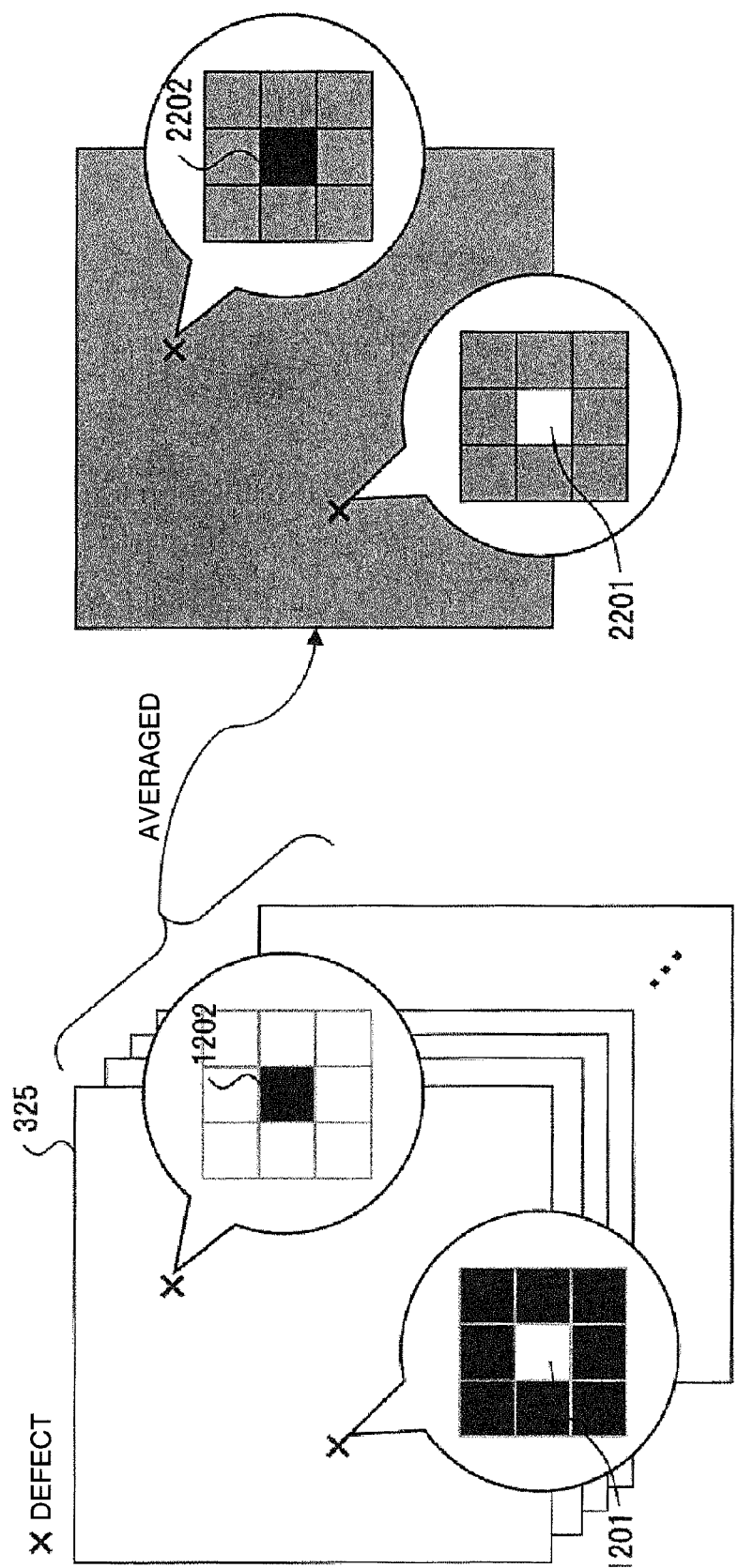
FIG. 18 is a schematic diagram showing a method of detecting locations of defects in the light detector.

FIG. 18 shows an example method for detecting defect positions in the light detector. In the data processing during the recording operation, this method involves making the number of on-pixels and the number of off-pixels almost equal; reproducing a plurality of pages of recorded data, which have been scrambled (903) by adding pseudorandom number sequences to the data sequences for the purpose of preventing a repetition of the same pattern; and taking an average of data values for each of pixels on the light detector 325. This procedure is expected to cause the average for each pixel to be a median value between the on-pixel and the off-pixel. However, if there is any bright defect 1201 on the light detector 325, the average value of a pixel 2201 becomes almost equal to the value of on-pixel. Similarly, in the case of the dark defect 1202, the average value of a pixel 2202 is almost equal to the value of off-pixel. It is therefore possible to find the bright defect 1201 and the dark defect 1202, respectively, in the light detector 325 by successively reproducing a plurality of pages and taking an average for each pixel on the light detector 325. Particularly by putting the reproduced multiple pages, which are to be used for calculating an average, in a book 4 in the management area 5 where the control data is recorded, these pages can be read at the same time that the control data is read (603) when the power of the recording/reproducing device 10 loaded with the optical information recording medium 1 is turned on. This arrangement shortens the time it takes for the recording/reproducing device 10 to get ready (605).

Figure 20:
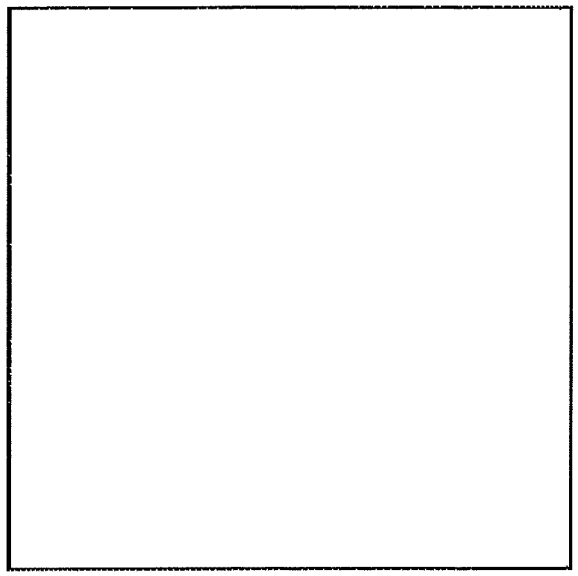
FIG. 20 is a schematic diagram showing two-dimensional data used in detecting defect positions in the light detector, or a detected image.
Figure 21:
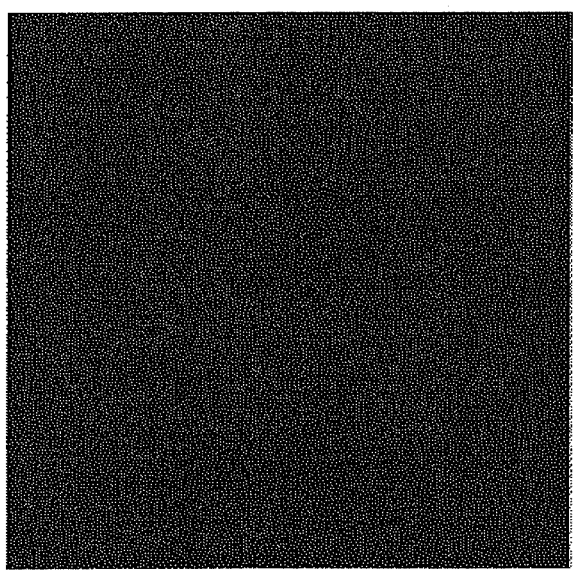
FIG. 21 is a schematic diagram showing a detected image used in detecting defect positions in the light detector.
Figure 22:
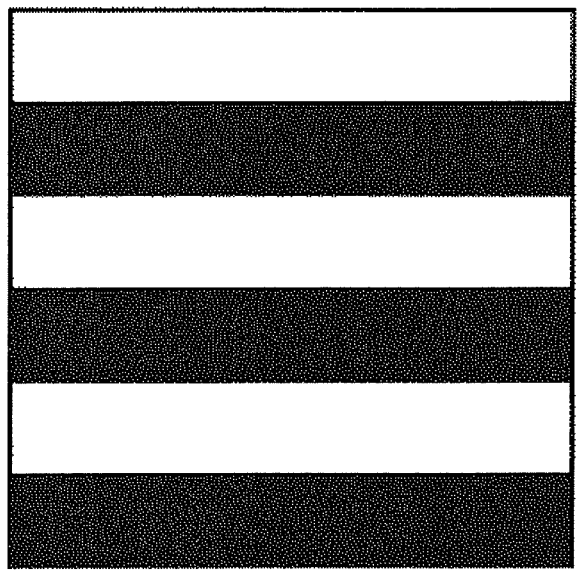
FIG. 22 is a schematic diagram showing two-dimensional data used in detecting defect positions in the light detector, or a detected image.
Figure 23:
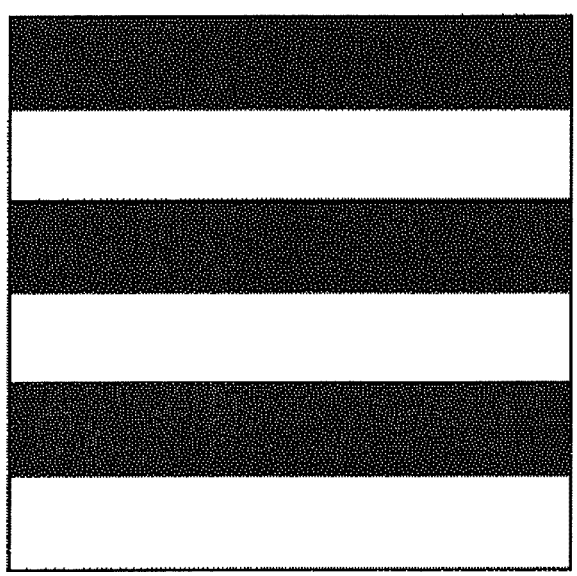
FIG. 23 is a schematic diagram showing two-dimensional data used in detecting defect positions in the light detector, or a detected image.
Figure 24:
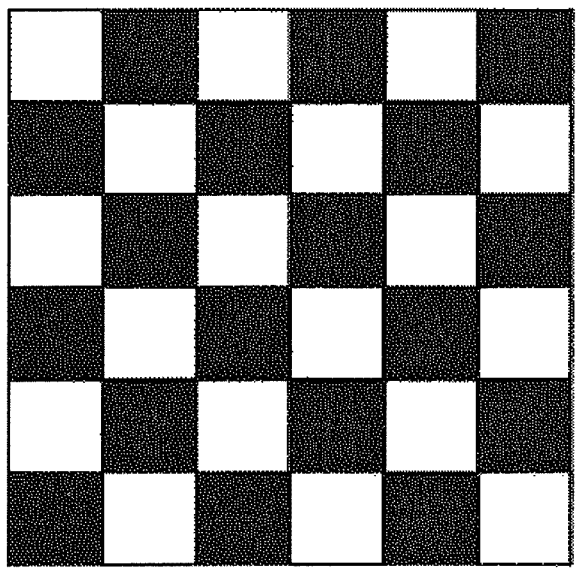
FIG. 24 is a schematic diagram showing two-dimensional data used in detecting defect positions in the light detector, or a detected image.
Figure 25:
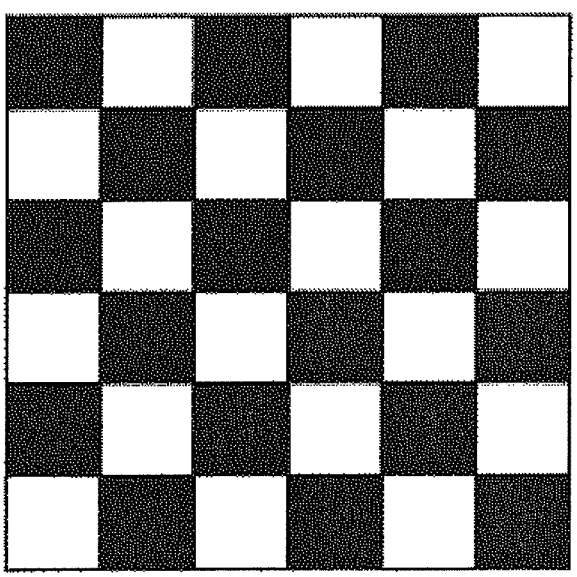
FIG. 25 is a schematic diagram showing two-dimensional data used in detecting defect positions in the light detector, or a detected image.

As a way to find positions and kinds of defects in the light detector 325 quickly without using the average of a plurality of pages, a method is available which involves recording two or more kinds of special patterns intended for adjustments including defect detection and reproducing these patterns. These special patterns may, for example, be a combination of two-dimensional data with all pixels turned on, as shown in FIG. 20, and two-dimensional data with all pixels turned off, as shown in FIG. 21, i.e., a combination of images reproduced from an angle where no two-dimensional data has been recorded; a combination of stripe patterns, one shown in FIG. 22 and one shown in FIG. 23 in which the relation between the on-pixels and off-pixels of FIG. 22 is reversed; and a combination of checker patterns, one shown in FIG. 24 and one shown in FIG. 25 which has the relation between the on-pixel and off-pixel of FIG. 24 reversed. The use of two kinds of two-dimensional data in a reverse relationship with each other enables the positions and kinds of defects on the light detector 325 to be found, by either directly using the detected values or using an average for each pixel on the light detector 325. Particularly by recording the special pages, made up of two kinds of two-dimensional data in a reverse relationship with each other, in a book 4 in the management area 5 where the control data is recorded, the special pages can be read at the same time that the control data is read (603) when the power of the recording/reproducing device 10 loaded with the optical information recording medium 1 is turned on. This arrangement further shortens the time it takes for the recording/reproducing device 10 to be ready (605).

As an example of the defect detection operation 111 on the spatial light modulator, there is a method for finding the positions and kinds of defects in the spatial light modulator 312 by reproducing a hologram recorded in the optical information recording medium 1. This detection method involves: reproducing a plurality of pieces of two-dimensional data, as in the defect detection operation on the light detector 325; taking an average of the data for each pixel before or after the resampled two-dimensional data is binarized; and, while the averaged value for each pixel is expected to be a median value between the on-pixel and the off-pixel, determining as a bright defect a pixel whose value is almost equal to that of the on-pixel and as a dark defect a pixel whose value is almost equal to that of the off-pixel. The detection method may further use two kinds of two-dimensional data that are in an inverted relation with each other. It is therefore possible to detect the positions and kinds of defects in the spatial light modulator 312, either by directly using the detected values or using the average value of resampled two-dimensional data for each pixel.

Figure 19:
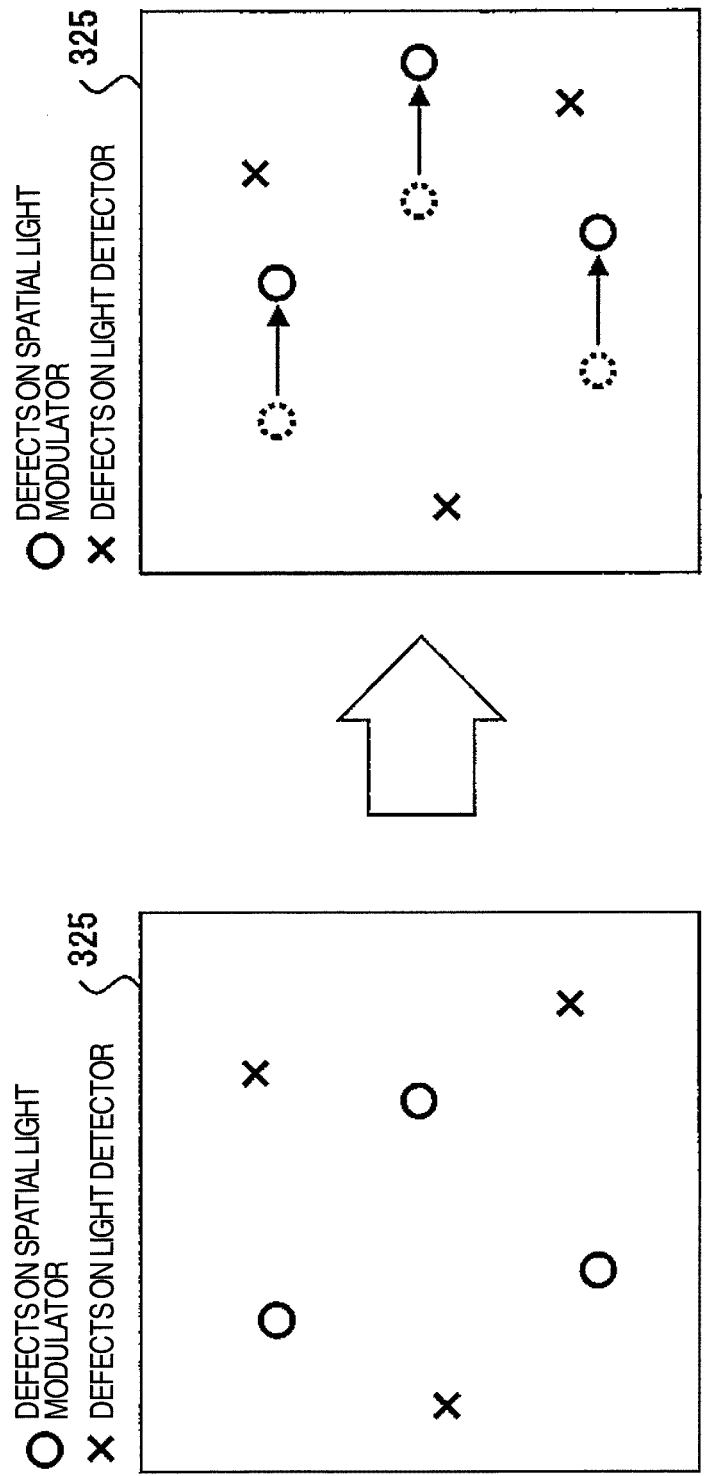
FIG. 19 is a schematic diagram showing a method of detecting locations of detects in the spatial light modulator and the light detector.

When the defect detection operation 102 on the light detector and the defect detection operation 111 on the spatial light modulator are done by the same hologram reproduction-based detection method, whether a detected defect is that of the light detector 325 or that of the spatial light modulator 312 is decided by slightly shifting the optical information recording medium 1 in a rotation direction or in a radial direction and executing the same defect detection operation again, as shown in FIG. 19. At this time, if the position of a defect detected on the light detector 325 matches a previously detected defect position, the defect in question is determined to be a defect of the light detector 325. If the position of a defect detected on the resampled two-dimensional data matches a previously detected defect position, that defect is decided to be a defect of the spatial light modulator 312.

The information of defects detected on the spatial light modulator 312 by the method described above and the information of defects on the spatial light modulator 312 that has been stored in the nonvolatile memory 92 during mass production are recorded in the optical information recording medium 1 as part of the control data in the management area during the control data recording operation. Further, the information on defects of the light detector 325 is stored in the nonvolatile memory 92 before the power of the recording/reproducing device is turned off.

The present invention is not limited to the above-described embodiments and includes a range of variations. The above embodiments have been described in detail for easy understanding of this invention and is not necessarily limited to those embodiments that include all the constructions explained above. It is possible to replace a part of the construction of one embodiment with the construction of another embodiment. It is also possible to add to the construction of one embodiment the construction of another embodiment. Further, any part of the construction of any of the above embodiments may be deleted or replaced with another construction, or may have another construction added thereto.

It is also noted that the constructions, functions and processing units and processing means described above may be implemented partly or wholly by hardware, for example by designing them in the form of integrated circuits. The above constructions and functions may also be implemented by software, with a processor interpreting and executing programs that realize the functions. Information used to implement the functions, including programs, tables and files, can be placed in storage devices, such as memories, hard disks and SSDs (solid state drives), or in storage media such as IC cards, SD cards and DVDs.

It is also noted that the control lines and information lines shown in the drawings are those considered necessary for explanation and do not necessarily cover all the lines found in the product. In practice, there is no problem if almost all units or blocks are considered to be mutually connected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording and reproducing device which records an interference fringe pattern as a hologram in an optical information recording medium, the interference fringe pattern being formed by a signal beam superimposed with signal information and a reference beam, and which reproduces the signal information from the optical information recording medium, the device comprising:
   a light source unit to emit light;
   a light splitting unit to split the light into the reference beam and the signal beam;
   a spatial light modulation unit to superimpose the signal information on the signal beam;
   a light detection unit to detect an image reproduced by the reference beam; and
   an error correction unit to correct errors for the reproduced data;
   wherein information about defects position on the spatial light modulation unit is recorded in the optical information recording medium,
   wherein the defect position information on the spatial light modulation unit recorded in the optical information recording medium is reproduced before the signal information is reproduced from the optical information recording medium; and
   wherein according to the reproduced defect position information on the spatial light modulation unit, the error correction unit performs a loss correction operation that handles defect positions of the spatial light modulator as known error positions, for the reproduced data when the reproduced data include the defect corresponding to a bright defect or a dark defect of the spatial light modulator, and then the signal information is reproduced.

2. The optical information recording and reproducing device according to claim 1, wherein the defect information on the spatial light modulation unit that is recorded in the optical information recording medium is information about positions of defects.

3. The optical information recording and reproducing device according to claim 1, wherein the defect information on the spatial light modulation unit that is recorded in the optical information recording medium is information about positions and kinds of defects.

4. The optical information recording and reproducing device according to claim 1, wherein the defect information on the spatial light modulation unit that is recorded in the optical information recording medium is information about positions of defects and a range recorded by the device.

\* \* \* \* \*